US008285844B2

(12) United States Patent
Hussaini et al.

(10) Patent No.: US 8,285,844 B2
(45) Date of Patent: *Oct. 9, 2012

(54) SERVER SCANNING SYSTEM AND METHOD

(75) Inventors: Amanullah Hussaini, Irving, TX (US); Asad M. Baig, Irving, TX (US); Venkat D. Raghavan, Chennai (IN); Krishna Devulapally, Warangal (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/006,138

(22) Filed: Jan. 13, 2011

(65) Prior Publication Data
US 2011/0113128 A1 May 12, 2011

Related U.S. Application Data

(63) Continuation of application No. 12/240,726, filed on Sep. 29, 2008, now Pat. No. 7,873,729.

(51) Int. Cl.
*G06F 15/173* (2006.01)

(52) U.S. Cl. .................. 709/224; 709/220; 709/203

(58) Field of Classification Search .......... 709/223–224, 709/220, 203
See application file for complete search history.

(56) References Cited

U.S. PATENT DOCUMENTS

| 6,122,663 | A | * | 9/2000 | Lin et al. .................. 709/224 |
|---|---|---|---|---|
| 7,577,701 | B1 | | 8/2009 | Johns et al. |
| 7,873,729 | B2 | * | 1/2011 | Hussaini et al. ............. 709/224 |
| 2002/0087612 | A1 | * | 7/2002 | Harper et al. ................ 709/100 |
| 2002/0091612 | A1 | * | 7/2002 | Greene et al. ................. 705/37 |
| 2004/0158837 | A1 | | 8/2004 | Sengodan |
| 2005/0076052 | A1 | * | 4/2005 | Kojima ........................ 707/102 |
| 2007/0041330 | A1 | * | 2/2007 | Bostica et al. ............... 370/252 |
| 2007/0208799 | A1 | | 9/2007 | Hughes |
| 2007/0294757 | A1 | * | 12/2007 | Stephens et al. ............... 726/12 |
| 2008/0216173 | A1 | | 9/2008 | Hammond |
| 2009/0225763 | A1 | * | 9/2009 | Forsberg et al. ............. 370/401 |

* cited by examiner

*Primary Examiner* — Philip B Tran

(57) ABSTRACT

A technique for quickly locating, diagnosing and fixing problems with one or more servers is presented. The technique improves upon prior art techniques by providing a centralized utility by which multiple servers may be viewed and modified. More particularly, the technique allows a user to view, in a consolidated format, features of multiple servers and to modify parameters of such servers from a remote location.

16 Claims, 29 Drawing Sheets

| Application | RETAIL CMS | Server | All Servers | | Everything about systems | Refresh | Admin |
|---|---|---|---|---|---|---|---|

| Server | Status | Virtual Dir Name | Directory Path | Default Page |
|---|---|---|---|---|
| BHDP1LRRCA01 | Running | Keepalive | D:\App\WebKeepalive | keepalive.asp.D |
| BHDP1LRRCA01 | Running | PaymentLocations | D:\App\WebPaymentLoc... | default.aspx |
| BHDP1LRRCA01 | Running | bsgprodmgmt | D:\App\Websgprodmgmt | Default.htm_Def... |
| BHDP1LRRCA01 | Running | NFOneRetail | D:\vmw\Microsoft Content | Default.htm_Def... |
| BHDP1LRRCA01 | Running | CMS_Edit | D:\App\WebCMS_Edit | default.aspx |
| BHDP1LRRCA01 | Running | OneRetailWS | d:\app\web\OneRetailWS | Default.htm_Def... |
| BHDP1LRRCA01 | Running | Business | d:\app\web\business | default.aspx |
| BHDP1LRRCA01 | Running | eServices | D:\App\WebeServices | default.aspx |
| BHDP1LRRCA01 | Running | CLICK_Edit | D:\App\WebCMS_Edit | default.aspx |
| BHDP1LRRCA01 | Running | CallingAreasWS | D:\App\WebCallingAreas | default.aspx |
| BHDP1LRRCA01 | Running | BillingExplanations | D:\App\WebBillingExplan... | default.aspx |
| BHDP1LRRCA01 | Running | BillingExplanationsWs | D:\App\WebBillingExplan... | default.asmx |
| BHDP1LRRCA01 | Running | ContactNumbers | D:\App\WebContactNumb... | default.aspx |
| BHDP1LRRCA01 | Running | VerizonEncore | D:\App\WebVerizonEncore | default.aspx |
| BHDP1LRRCA01 | Running | CallingAreas | D:\App\Webcallingareas | default.aspx |
| BHDP1LRRCA01 | Running | ForYourHome | D:\App\WebForYourHome | home.aspx?hp=1 |
| BHDP1LRRCA01 | Running | Content | D:\App\Webcontent | default.aspx |
| BHDP1LRRCA01 | Running | Qualification | D:\App\WebQualification | default.aspx |
| BHDP1LRRCA01 | Running | OneRetailCMS | D:\App\WebOneRetailCMS | Default.htm_Def... |
| BHDP1LRRCA01 | Running | UniversalLogin | D:\App\WebUniversalLogin | default.aspx |
| BHDP1LRRCA01 | Running | Switchboard | D:\App\WebSwitchboard | default.aspx |
| BHDP1LRRCA01 | Running | businessfios | D:\App\WebCMS_business... | home.aspx?hp=2 |
| BHDP1LRRCA01 | Running | getbusinessfios | D:\App\WebCMS_business... | default.aspx |
| BHDP1LRRCA01 | Running | contentreporting | D:\App\WebCMS_Content... | default.aspx |
| BHDP1LRRCA01 | Running | FIOSEspanol | D:\App\WebContentFIO... | default.aspx |
| BHDP1LRRCA01 | Running | FIOSSupport | D:\App\WebContentFIO... | default.aspx |
| BHDP1LRRCA01 | Running | jobs | D:\App\WebContentcar... | default.aspx |
| BHDP1LRRCA01 | Running | residential | D:\App\WebContentresi... | default.aspx |
| BHDP1LRRCA01 | Running | dslespanol | D:\App\WebContentCon... | default.aspx |
| BHDP1LRRCA01 | Running | NR | D:\vmw\Microsoft Content | Default.htm_Def... |
| BHDP1LRRCA01 | Running | MCMS | D:\App\WebContent | default.aspx |
| BHDP1LRRCA01 | Running | Help | D:\App\WebContentHelp | Default.htm_Def... |
| BHDP1LRRCA01 | Running | ResidentialHelp | D:\App\WebContentHelp | default.aspx |

Legend: Success or Above Threshold · Warning of Some Components failed or between 5% and 20% Threshold or Timeout · Critical Error or below 5% Threshold · Un Available of Not Applicable

Fig. 19

| | | | |
|---|---|---|---|
| | | | Admin |
| RETAIL/Implementation & Application Support | | Everything about systems | |
| MAGIC SCAN TOOL | | Everything about systems | |
| Application RETAIL CMS | | Server BHDP1LRRCA01 | Refresh |
| Server Name | Service Type | Description | Status |
| AClient | Manual | Altiris Client Service | Stopped |
| AESecurityService | Auto | AESecurityService | Running |
| Alerter | Manual | Alerter | Stopped |
| AppMgmt | Manual | Application Management | Stopped |
| aspnet_state | Manual | ASP.NET State Service | Stopped |
| awhost32 | Auto | pcAnywhere Host Service | Running |
| BGS_SDService | Auto | BGS_SDService | Running |
| BITS | Manual | Background Intelligent Transfer Service | Running |
| Browser | Auto | Computer Browser | Running |
| CcmExec | Auto | SMS Agent Host | Running |
| CiMnotify | Disabled | HP Insight Event Notifier | Stopped |
| cisvc | Disabled | Indexing Service | Stopped |
| ClipSrv | Manual | ClipBook | Stopped |
| clr_optimization_v2.0.50727_32 | Manual | .NET Runtime Optimization Service v2.0.5... | Running |
| CpqRcmc | Auto | HP Insight NIC Agent | Running |
| CPQNicMgmt | Auto | HP ProLiant Remote Monitor Service | Stopped |
| cpqcissrv | Disabled | HP Version Control Agent | Stopped |
| CqMgHost | Auto | HP Insight Foundation Agents | Running |
| CqMgServ | Auto | HP Insight Server Agents | Running |
| CqMgStor | Auto | HP Insight Storage Agents | Running |
| DbgProxy | Manual | Visual Studio Debugger Proxy Service | Stopped |
| DbgSvc | Auto | Debug Diagnostic Service | Running |
| DefWatch | Auto | Symantec AntiVirus Definition Watcher | Running |
| Dfs | Manual | Distriguted File System | Stopped |
| Dhcp | Auto | DHCP Client | Running |
| Diskeeper | Manual | Diskeeper | Stopped |
| dmadmin | Manual | Logical Disk Manager Administrative Servi... | Stopped |
| dmserver | Auto | Logical_Disk Manager | Running |
| Dnscache | Auto | DNS Client | Running |
| Eventlog | Auto | Event Log | Running |
| EventSystem | Manual | COM+ Event System | Running |
| F-Secure SSH Server | Auto | F-Secure SSH Server | Running |
| Fax | Disabled | Fax Service | Stopped |

SERVER SCANNING SYSTEM AND METHOD

CROSS-REFERENCE TO RELATED APPLICATIONS

This continuation application claims the benefit of U.S. application Ser. No. 12/240,726 filed Sep. 29, 2008, now U.S. Pat. No. 7,873,729, the disclosure of which is expressly incorporated herein by reference in its entirety.

BACKGROUND INFORMATION

In general, users may access resources available over networks, such as the internet. Typically, many servers exist to serve such resources to users, and the particular server that provides a resource to an individual user is unknown to the user.

BRIEF DESCRIPTION OF THE FIGURES

FIG. 6 is a depiction of several web configuration features of a dashboard according to an embodiment.

FIG. 11 is a depiction of several detailed IIS features of a dashboard according to an embodiment.

FIG. 19 is a depiction of several operating system and middleware comparison features according to an embodiment.

FIG. 22 is a depiction of service utilities features according to an embodiment.

FIG. 29 is a depiction of an application and web service mapping configuration screen according to an embodiment.

DETAILED DESCRIPTION OF PREFERRED EMBODIMENTS

The following description is intended to convey an understanding by providing specific embodiments and details. It is understood, however, that the present invention is not limited to these specific embodiments and details, which are exemplary only. It is further understood that any number of alternative embodiments may be implemented within the scope of the appended claims, depending upon specific design and other needs.

Figure 1:
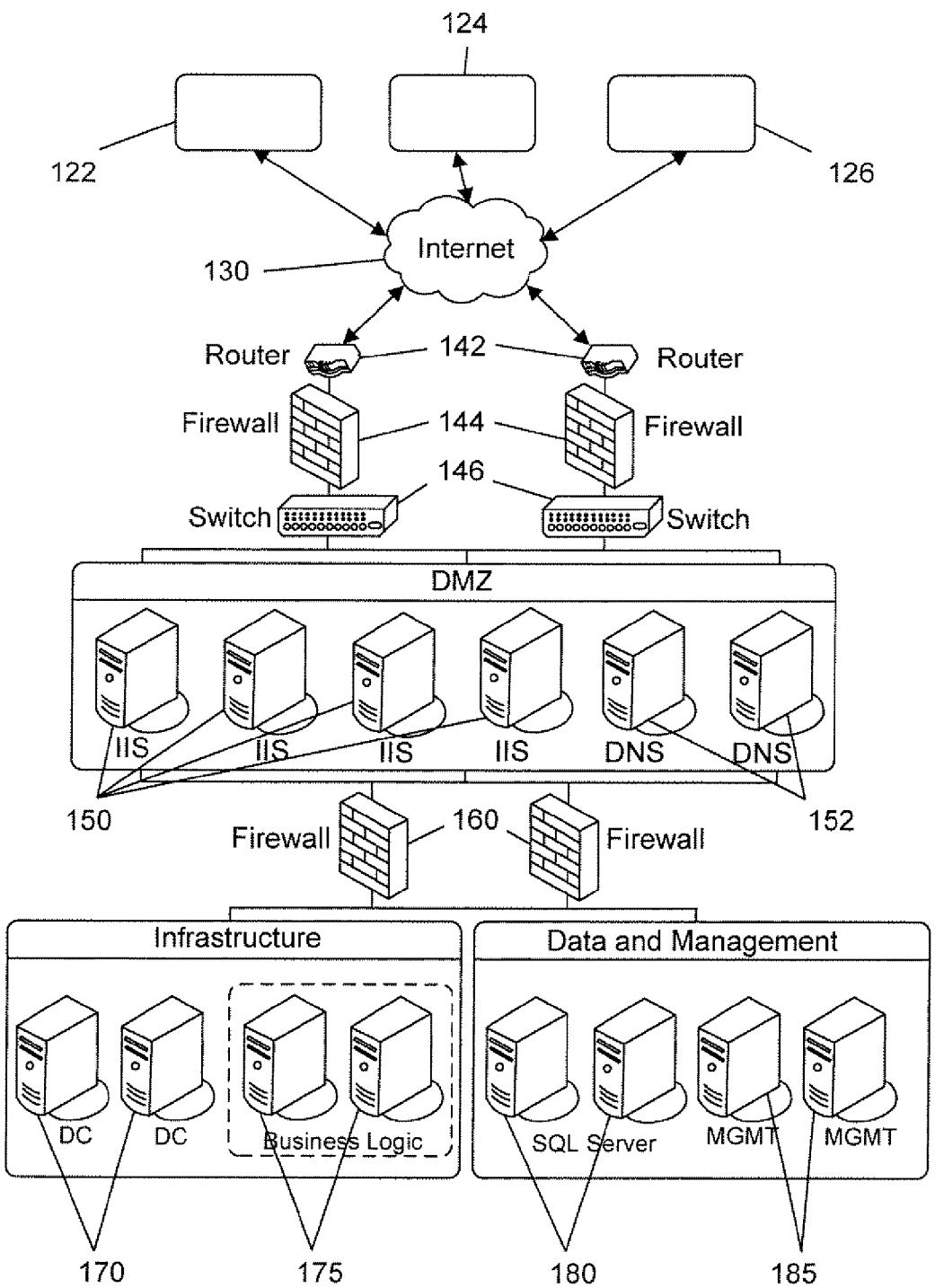
FIG. 1 is a schematic diagram of an environment where an embodiment may be implemented.

FIG. 1 is a schematic diagram of an environment where an embodiment may be implemented. An entity, by way of non-limiting example, a telecommunications company, may provide content or applications (collectively, "resources") to any person connected to network 130, which may be the internet. Members of the public, entity employees or contractors may connect to network 130, using user computers 122, 124, 126. Each user computer 122, 124, 126 may include a monitor, keyboard and mouse. Through network 130, user computers 122, 124, 126 may access resources via servers as discussed presently.

User computers 122, 124, 126 are coupled via network 130 to routers 142, which act to, for example, screen ports. The entire system behind routers 142 (e.g., elements 142-185) may reside on a single domain or on multiple domains. By way of non-limiting example, routers 142 may allow connections with port numbers 80 and 443 only. Firewalls 144 are coupled to routers 142. Firewalls 144 serve as an additional layer of security. Firewalls 144 are coupled to switches 146. Switches 146 may perform load balancing using, by way of non-limiting example, a Cisco Softswitch, available from Cisco Systems, Inc. of San Jose, Calif.

A first set of servers 150 lie behind switches 146. Servers 150 may be, by way of non-limiting example, Internet Information Servers. Further, servers 150 may serve web pages, which may include one or both of content and applications. Such applications may be, by way of non-limiting example, billing applications that a user may use to pay bills electronically over the internet. Servers 150 may receive content and applications from additional servers as discussed below. Also coupled to switches 146 are domain name servers 152, which may allow for subdomain hosting.

Additional firewalls 160 lie between servers 150 and 152 on the one hand, and further servers and administrative hardware and software on the other hand. Such firewalls may provide an additional layer of protection by screening port traffic, for example.

Various servers 175, 180 and administrative hardware and software 170, 185 are coupled to firewalls 160. (Each server 150, 152, 170, 175, 180, 185 may include a display device, such as a monitor, and standard input devices such as a keyboard and mouse.) Application servers 175 may store and serve business logic such as, by way of non-limiting example, billing applications that a user may use to pay bills electronically over the internet. Each application server 175 may include multiple applications and may or may not include the same applications as other application servers 175. Domain controllers 170 assist in managing servers, users and resources inside of the domain, e.g., behind firewalls 144. Database servers 180 store and serve bulk data, such as billing records. By way of non-limiting example, database servers 180 may be SQL servers. Management servers 185 may be used to monitor and report usage of hardware and software in the system. By way of non-limiting example, management servers 185 may gather and report statistics on how database servers 180 are used.

In some embodiments, the same applications and content reside in each of servers 150, 175 and 180. In other embodiments, some applications and some content resides in some, but not all, of servers 150, 175 and 180. Further note that, in general, a user who attempts to access an application, such as a bill payment application, does not know which server will provide the application to the user. Typically, a user simply types a URL into a browser application (or clicks on a predefined bookmark), without knowing which physical device will provide the content or application that is associated with the URL or bookmark. For example, if a user attempts to use user computer 122 to access a resource that resides on more than one of servers 150, 175 and 180, the decision as to which server provides the user access to the resource is typically made automatically, without any knowledge of the user.

In some configurations, switches 146 are configured as load balancers, which work transparently to direct a particular user request to a particular server based on efficiency heuristics and routing algorithms. Thus, a user might type a URL for a bill payment application into the user's browser, which resides on user computer 122, and a load balancer might direct the user's request to one of servers 150, even though the same bill payment application might reside on each of servers 150 and 175. The next time the user types the same URL into the user's browser on user computer 122, the same load balancer might direct the user's request to a different server 150. In general, it is impossible for a user to know which server provides an application or content.

A problem known as an "outage" may arise in a situation when either one or multiple servers serve the same resource. During an outage, users are unable to access a particular application or content. This situation might arise when the a router, switch, server or servers associated with a particular application or content malfunction. When an outage occurs, users are unable to access that particular application or content until the responsible component(s) are repaired.

A problem known as a "partial outage" may arise in a situation when multiple servers serve the same resource. For example, one type of partial outage occurs when some, but not all, users are unable to access a particular application or content. That situation might arise when a server associated with a particular geographic area malfunctions, while other servers continue to operate normally. Another type of partial outage occurs when some (or all) users experience a slow response to the users' requests. This might occur when one or more servers malfunction, overburdening the remaining functional servers. Yet another type of partial outage may occur when a particular resource associated with a URL is unavailable to some or all users, yet other resources associated with that same URL remain available. Such a situation might arise when multiple servers are involved in serving multiple resources (e.g., a bill payment application and an account preferences display) that are associated with a single URL, and the server associated with a particular resource (e.g., the bill payment application) malfunctions, while the server associated with another resource (e.g., the account preferences display) continues to operate normally. Yet another type of partial outage occurs when one or more users are temporarily unable to access a resource. This might be caused by a sporadic malfunction in one or more servers.

When partial outages occur, it is generally difficult to pinpoint which server or servers is responsible. For example, a prior art technique for diagnosing the cause of a partial outage requires technical support staff to log in to each server separately in order to perform server health checks and configuration verifications. This technique takes a considerable amount of time. Certain embodiments improve on this prior art technique by allowing technical support staff to simultaneously perform server health checks and configuration verifications on a plurality of servers from a single access point, which may be remote from each server that is being diagnosed.

In general, certain embodiments allow entities, such as technical support staff, to view consolidated information about a plurality of servers and change parameters associated with one or more of the servers. The entity may be physically located at one of the servers and access the information (or change parameters) from that location, or may access such information (or change parameters) remotely. Thus, for example, an embodiment might allow an entity to view consolidated information about each of servers 150, 152, 170, 175, 180 and 185. In this example, the entity may access such information via any of servers 150, 152, 170, 175, 180 and 185, or may access such information via any of user computers 122, 124, 126. In some embodiments, servers accessed can be filtered by application, such that only servers associated with an application experiencing a partial outage are scrutinized.

According to certain embodiments, monitoring software may be installed in one or more of servers 150, 152, 170, 175, 180 and 185. In some embodiments, identical monitoring software may be installed in each server, in other embodiments, different monitoring software may be installed in different servers. The monitoring software installed in each server serves at least two purposes. First, the monitoring software controls a configuration process in which information specific to each server is stored in association with each server. That is, each server has access to one or more configuration files, which contain information regarding every server in the system. The configuration process is discussed in detail below, with reference to FIGS. 25-29. Second, the monitoring software allows an entity, such as a technical support staffer, to retrieve and modify parameters of any of the servers. Moreover, such parameter retrieval and modification can be affected from any server in the system. That is, any person with access to a single server may use the monitoring software installed in that server to retrieve and modify parameters associated with any other server in the system. The parameter retrieval and modification process is discussed in detail below in reference to FIGS. 2-24. Monitoring software according to some embodiments may be written in any, or a combination, of Visual Basic .Net ("VB.Net"), Windows Management Instrumentation ("WMI"), Visual Basic, Visual C++, ASP, PERL, Java, J2EE, C++, and others.

Once the monitoring software is installed, one or more configuration files are created. The configuration files include information about each of servers 150, 152, 170, 175, 180 and 185. More particularly, the configuration files indicate where information pertaining to each of servers 150, 152, 170, 175, 180 and 185 may be found. To create the configuration files, configuration information of each server in the system is gathered together and placed into one or more configuration files. These files are then stored such that each server in the system may access them, e.g., locally stored in each server's persistent memory. In some embodiments, each server has its own identical copy of the configuration files, locally stored on that server's persistent storage device. The configuration process is discussed in detail below, in reference to FIGS. 25-29.

In general, FIGS. 2-24 depict exemplary screens that an entity uses to access information about multiple servers and change parameters associated with one or more servers. Some embodiments include three main portions, a "Dashboard" portion, a "Comparison" portion, and a "Utilities" portion. In general, though functionality may overlap, a dashboard, embodiments of which are depicted in FIGS. 2-17, allows an entity to view consolidated information about a plurality of servers, while a comparison portion, embodiments of which are depicted in FIGS. 18-21, allows an entity to view consolidated information about a plurality of applications running on a plurality of servers. Additionally, a utilities portion, depicted in FIGS. 21-24, allows an entity to adjust parameters for a plurality of servers.

Figure 2:
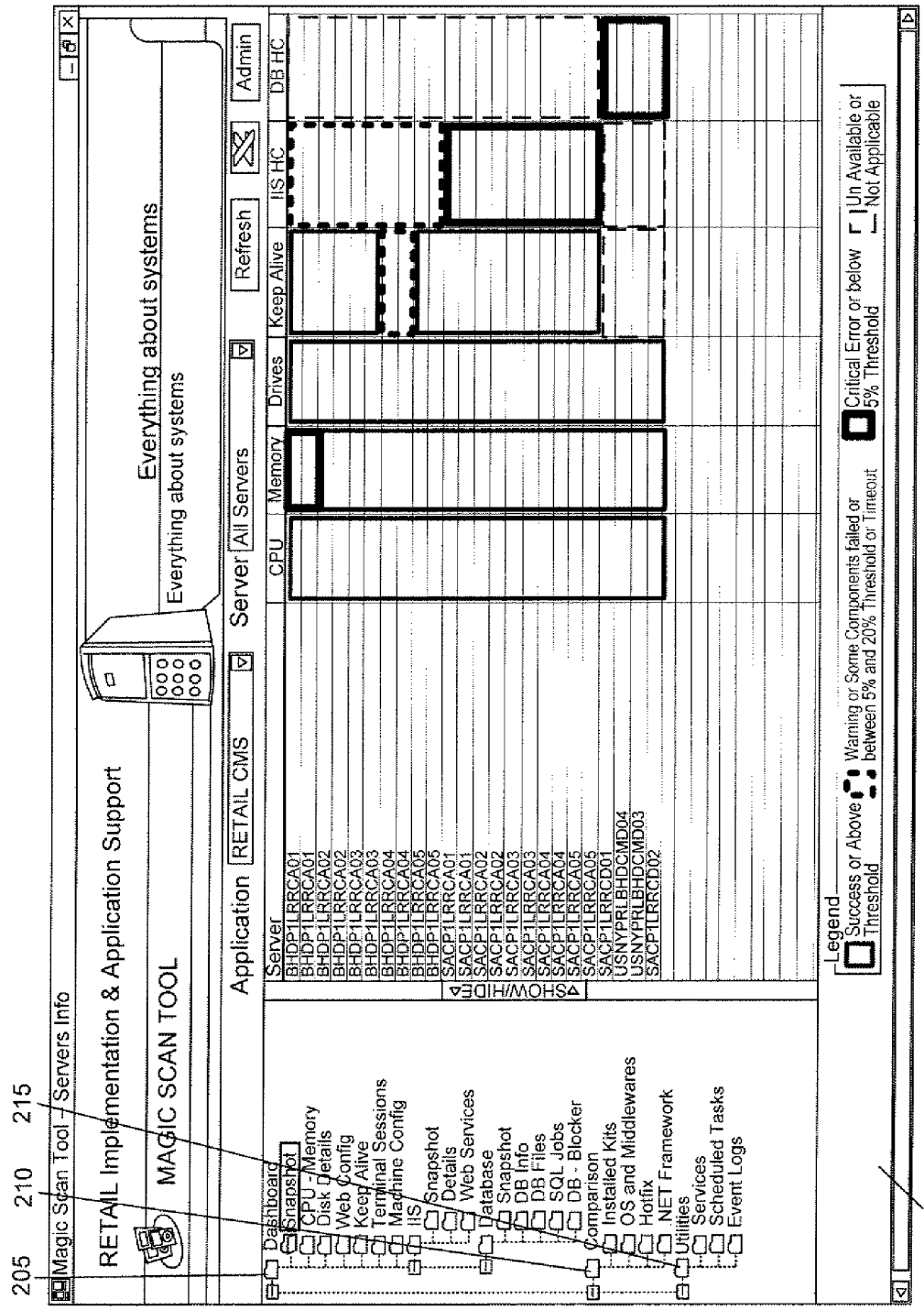
FIG. 2 is a depiction of a screen according to an embodiment.

FIG. 2 is a depiction of a diagnostic tool 200 according to an embodiment. Diagnostic tool 200 displays part of a dashboard menu tree 205, a comparison menu tree 210, and a utilities menu tree 215. Dashboard menu tree 205 may be expanded by clicking on the appropriate region of dashboard menu tree 205, comparison menu tree 210 may be expanded by clicking on the appropriate region of comparison menu tree 210, and utilities menu tree 215 may be expanded by clicking on the appropriate region of utilities menu tree 215.

Figure 3:
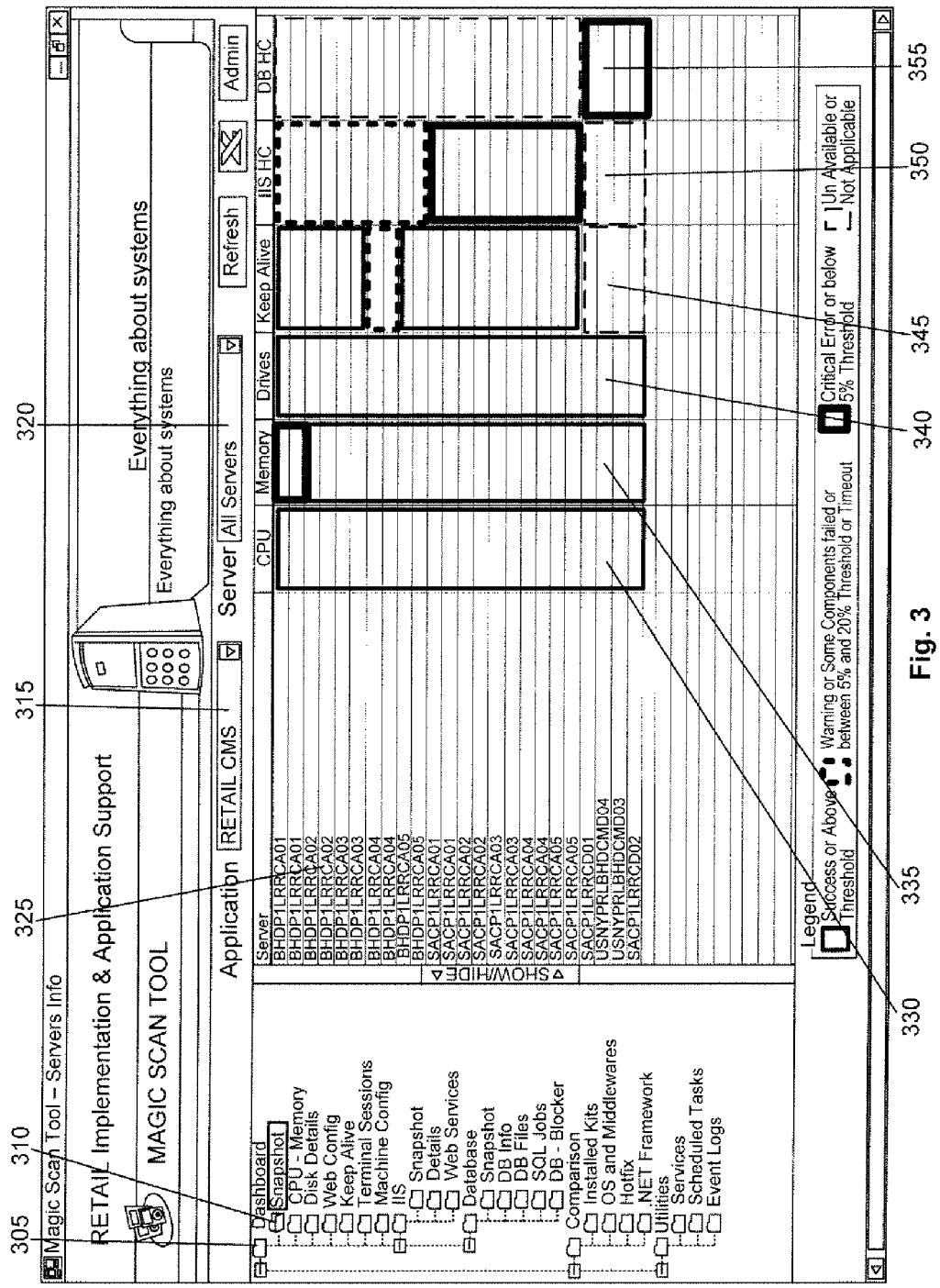
FIG. 3 is a depiction of several snapshot features of a dashboard according to an embodiment.

FIG. 3 is a depiction of several features of a dashboard according to an embodiment. In particular, FIG. 3 depicts dashboard menu tree 305 partially expanded with snapshot menu 310 activated. Once activated, snapshot menu 310 causes information to be displayed for the application(s) selected at application drop-down menu 315 and server(s) selected at server drop-down menu 320. The particular information displayed is controlled by the selection made at dashboard menu tree 305. As depicted in FIG. 3, selecting snapshot 310 causes a grid to appear, which lists each server 325, selected at server drop down menu 320, to appear in a separate row. Columns correspond to: CPU usage 330, memory (e.g., RAM) usage 335, hard drive storage available 340, keep alive status 345, Internet information server health check 350, and database health check 355. Each entry in the grid contains a color-coded assessment of the status of the particular feature in the corresponding column for the server in the corresponding row. Such color coding may include green, meaning that the status is within acceptable parameters, yellow, meaning that the status is questionable and should be examined more closely, red, meaning that the status is outside acceptable parameters and should be examined and corrected, and gray, meaning that the status is unavailable or not applicable.

Figure 4:
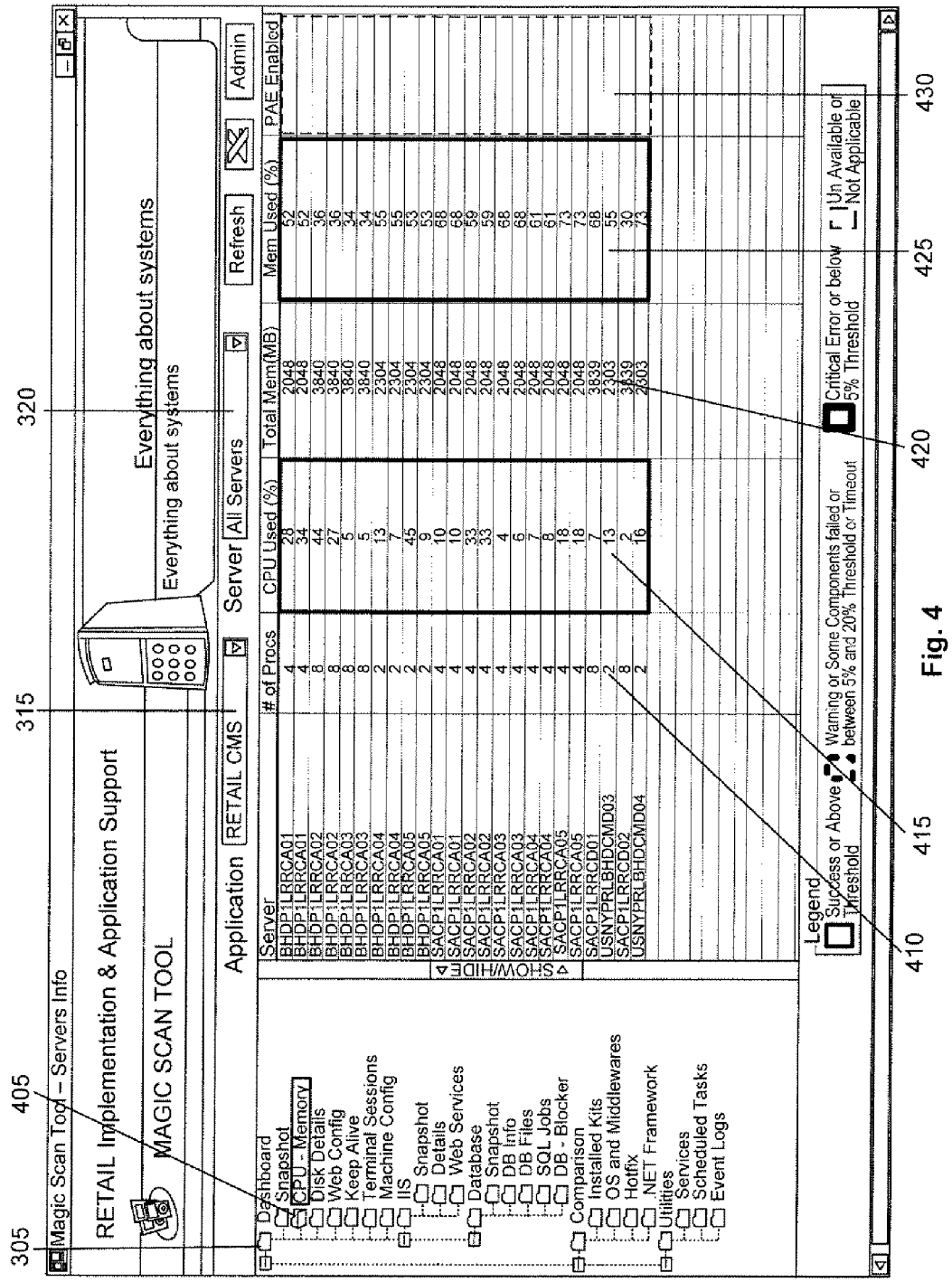
FIG. 4 is a depiction of several CPU-memory features of a dashboard according to an embodiment.

FIG. 4 is a depiction of several features of a dashboard according to an embodiment. Activating dashboard menu tree 305 selection "CPU-Memory" 405 causes the grid to display CPU and memory information for the application(s) selected at application drop-down menu 315 and server(s) selected at server drop-down menu 320. In particular, selecting "CPU-Memory" 405 causes five columns to be displayed in addition to the server column, where the columns correspond to the number of processes 410, the percentage of CPU cycles used 415, the total memory 420, the memory used percentage (associated with the selected server(s) and application(s)) 425, and the enablement of the physical address extension ("PAE") 430. The grid entries corresponding to the percentage of CPU cycles and the available memory percentage contain a color-coded assessment of the status of the particular feature for the server in the corresponding row.

Figure 5:
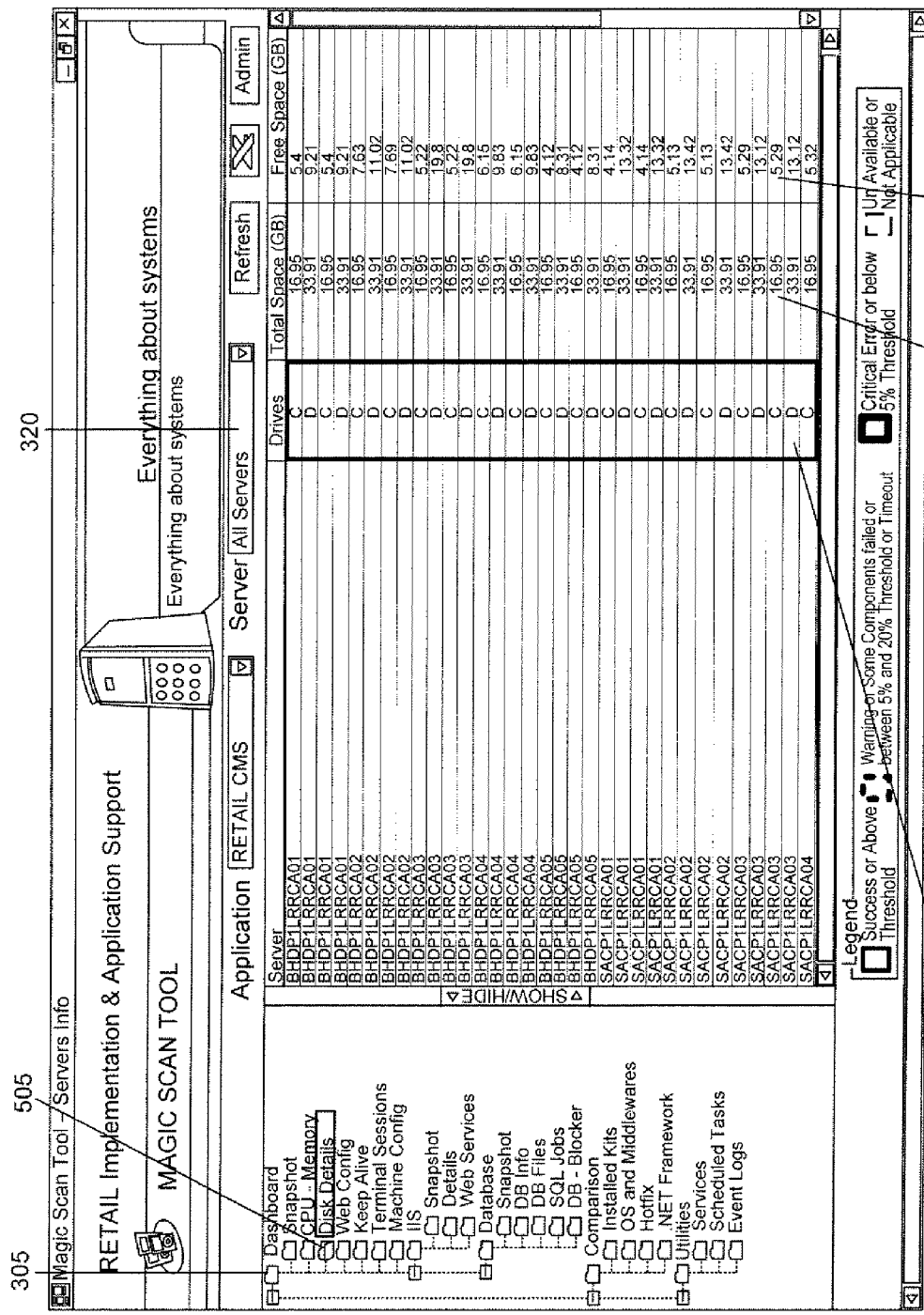
FIG. 5 is a depiction of several disk detail features of a dashboard according to an embodiment.

FIG. 5 is a depiction of several features of a dashboard according to an embodiment. Activating dashboard menu tree 305 selection "Disk Details" 505 causes the grid to display information regarding the hard disk drives attached to the server(s) selected at server drop-down menu 320, including their total storage capacity and their free space available. In particular, selecting "Disk Details" 505 causes three columns to be displayed in addition to the server column, where the columns correspond to the names of the drives operatively coupled to the selected servers 510, their capacity (e.g., in gigabytes) 515, and their free space (e.g., in gigabytes) 520. In certain embodiments, the drive grid entries may be color coded to display whether there are issues with the available free space. For example, a particular drive grid entry may appear green if there is sufficient free space available, yellow if there might be insufficient free space, or red if there is insufficient free space available. By right clicking drive names 510, a particular user may open a drive (e.g., C drive).

Figure 6:
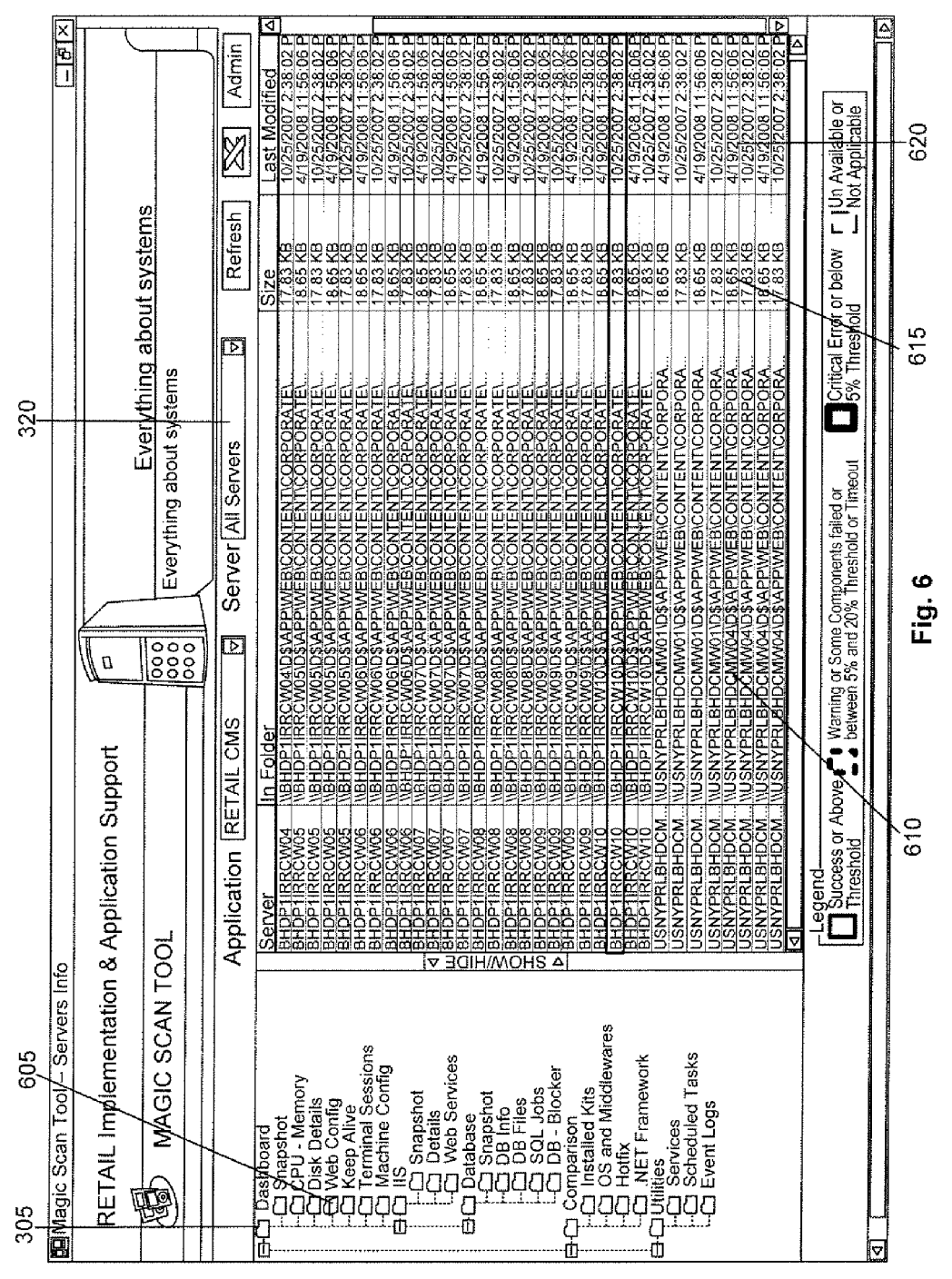

FIG. 6 is a depiction of several features of a dashboard according to an embodiment. Activating dashboard menu tree 305 selection "Web Config" 605 causes the grid to display web configuration information for the server(s) selected at server drop-down menu 320. In particular, selecting "Web Configuration" 605 causes three columns to be displayed in addition to the server column, where the columns correspond to folder (i.e., path) in which the web configuration file associated with the selected server(s) is located 610, the size of the file (e.g., in kilobytes) 615, and its last modified date (including time) 620. By right clicking, a user can open a web configuration file to view or edit it.

Figure 7:
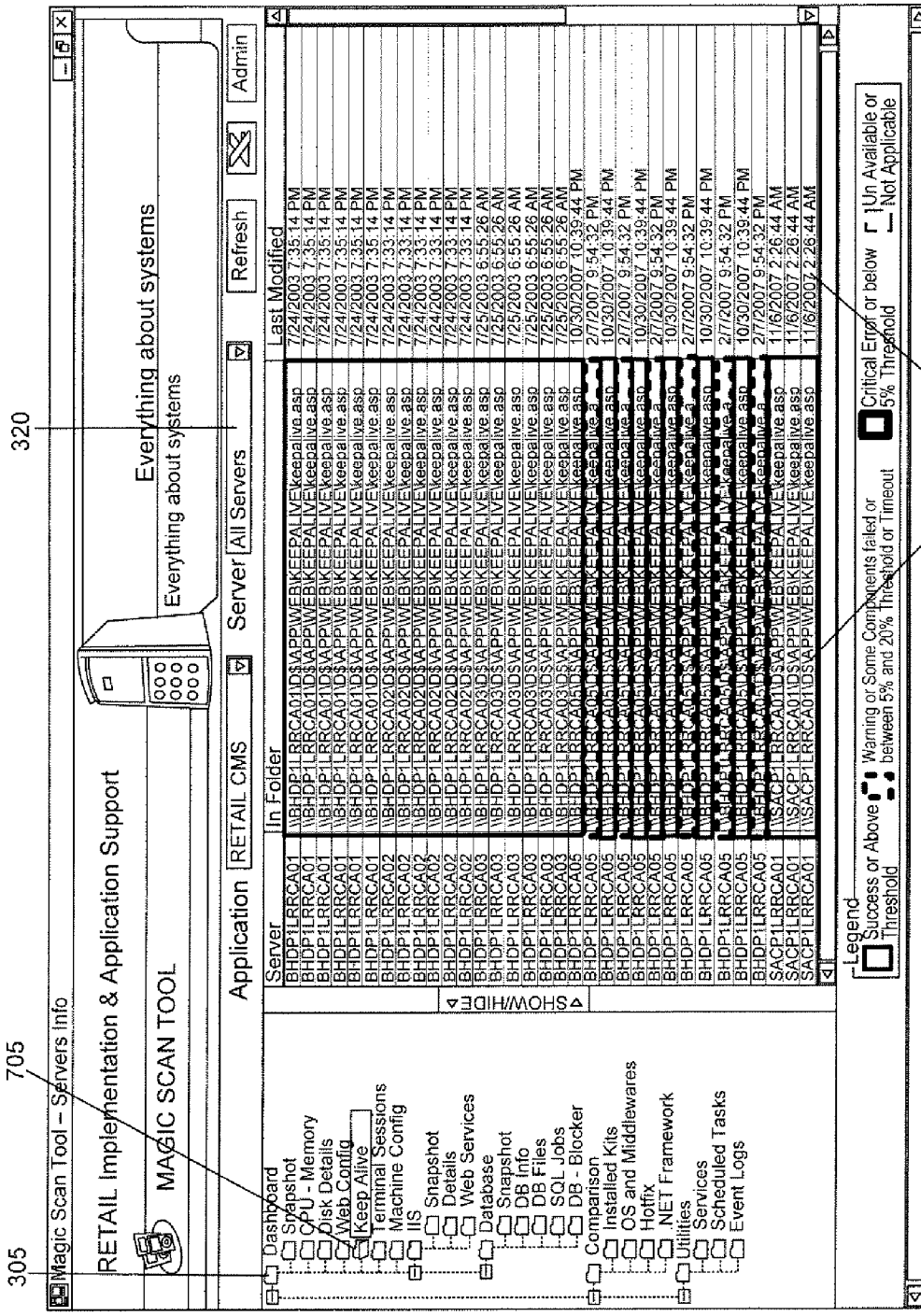
FIG. 7 is a depiction of several keep alive features of a dashboard according to an embodiment.

FIG. 7 is a depiction of several features of a dashboard according to an embodiment. Activating dashboard menu tree 305 selection "Keep Alive" 705 causes the grid to display keep alive information for the application(s) selected at application drop-down menu 315 and server(s) selected at server drop-down menu 320. In particular, selecting "Keep Alive" 705 causes two columns to be displayed in addition to the server column, where the columns correspond to folder (i.e., keep alive path) 710 and last modified date 715. By right-clicking, the keep alive information can be viewed, changed, and saved to an original or different location.

Figure 8:
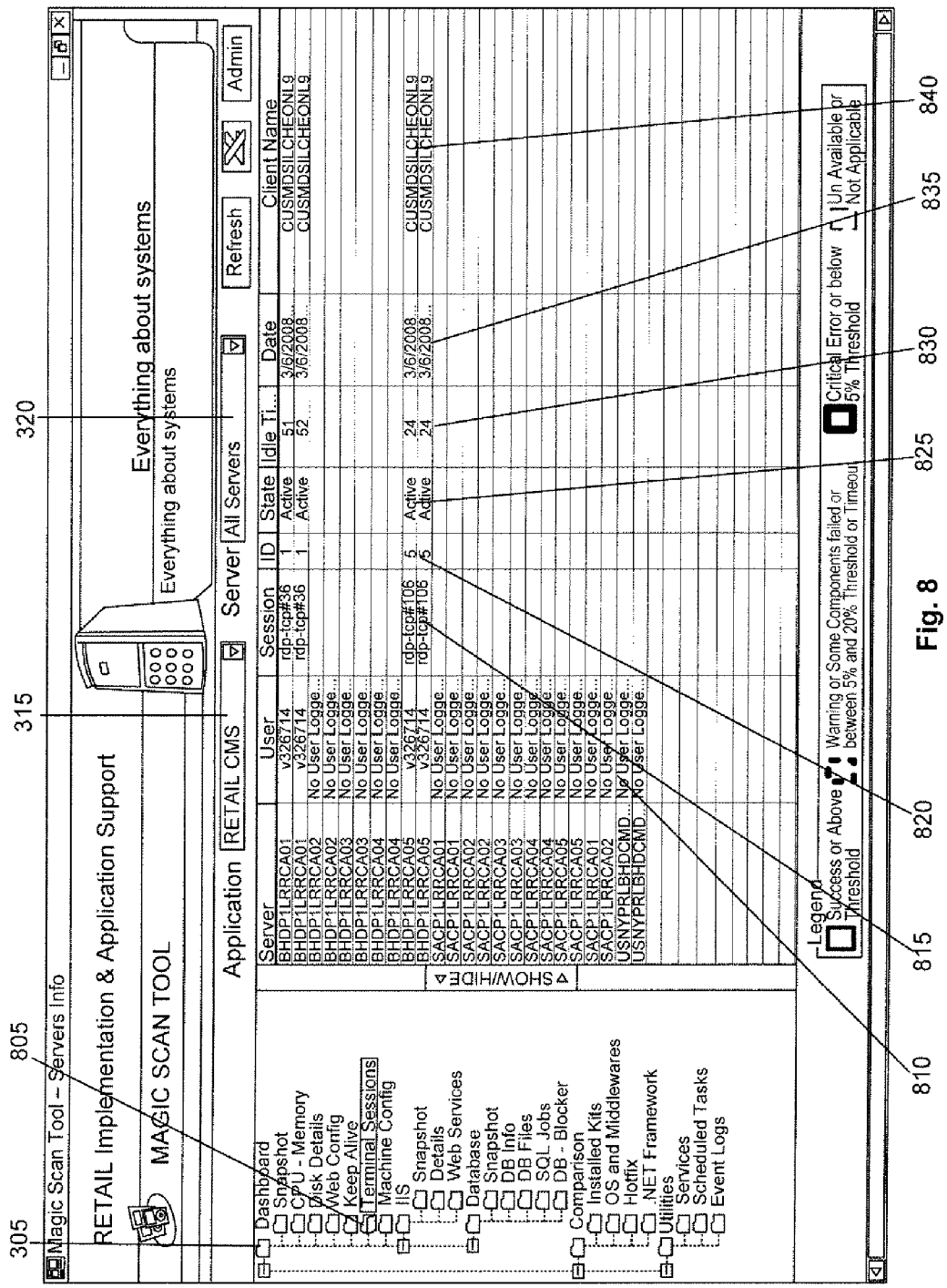
FIG. 8 is a depiction of several terminal session features of a dashboard according to an embodiment.

FIG. 8 is a depiction of further features of a dashboard according to an embodiment. Activating dashboard menu tree 305 "Terminal Sessions" 805 causes the grid to display terminal sessions information for the application(s) selected at application drop-down menu 315 and server(s) selected at server drop-down menu 320. In particular, selecting "Terminal Sessions" 805 causes seven columns to be displayed in addition to the server column, where the columns correspond to the user name 810, session 815, ID 820, state (e.g., active or idle) 825, idle time 830, date (including time) 835, and client name 840 associated with the selected server(s) and application(s). By right clicking, 805, a particular user can be logged off or a session reset.

Figure 9:
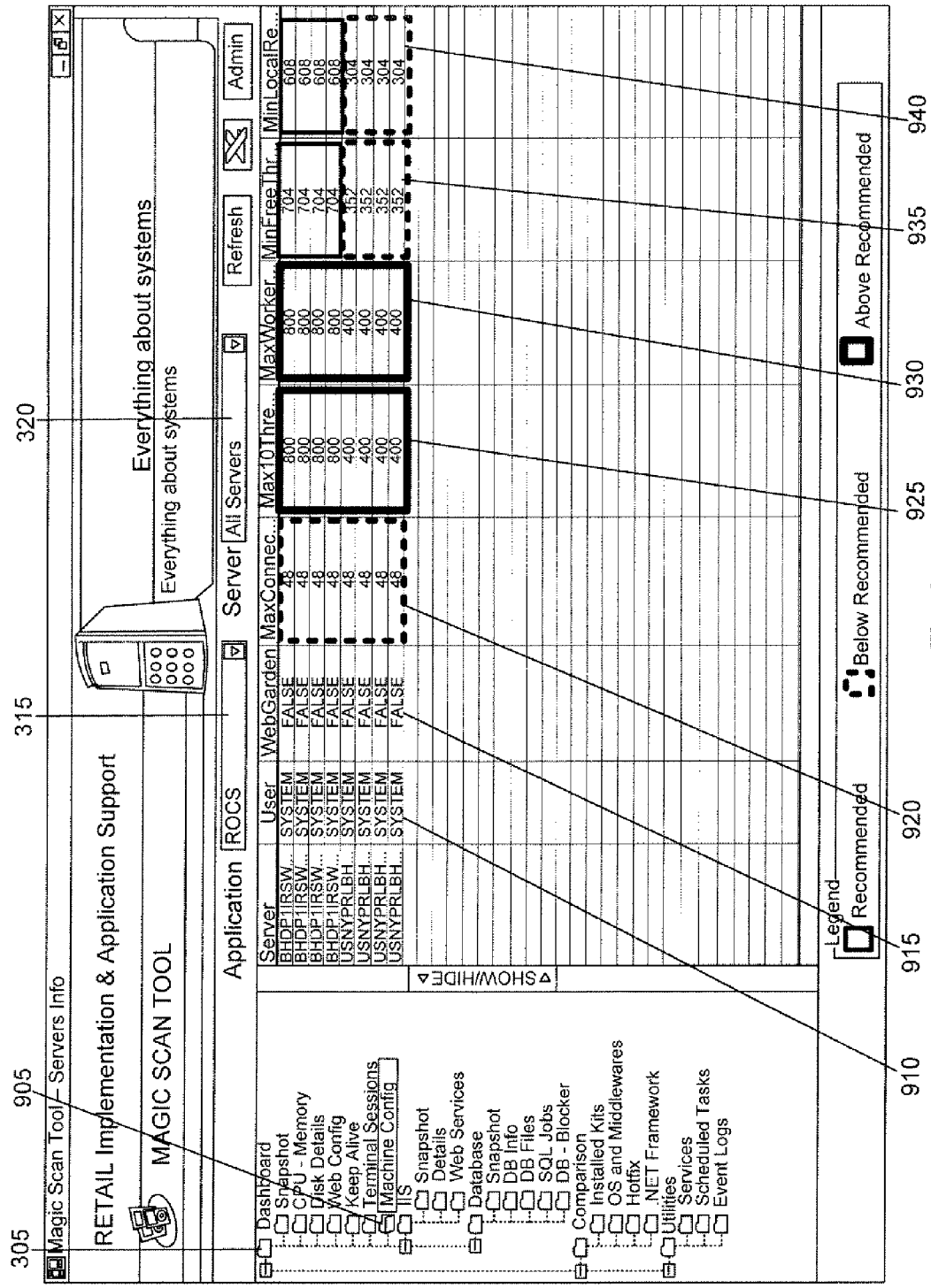
FIG. 9 is a depiction of several machine configuration features of a dashboard according to an embodiment.

FIG. 9 is a depiction of several features of a dashboard according to an embodiment. Activating dashboard menu tree 305 selection "Machine Configuration" 905 causes the grid to display machine configuration information for the application(s) selected at application drop-down menu 315 and server(s) selected at server drop-down menu 320. In particular, selecting "Machine Configuration" 905 causes seven columns to be displayed in addition to the server column, where the columns correspond to user name 910, web gardens (i.e., application pool that has multiple worker processes serving requests routed to that pool) 915, maximum connections allowed 920, maximum IO threads allowed 925, maximum worker threads allowed 930, minimum free threads 935, and minimum local request threads 940 associated with the selected server(s) and application(s). By right clicking, a user can open a machine configuration file to view, edit, and save its contents. In certain embodiments, a particular server grid entry may appear green if the connections are in the recommended range, yellow if below the recommended range and red if in the above recommended range.

Figure 10:
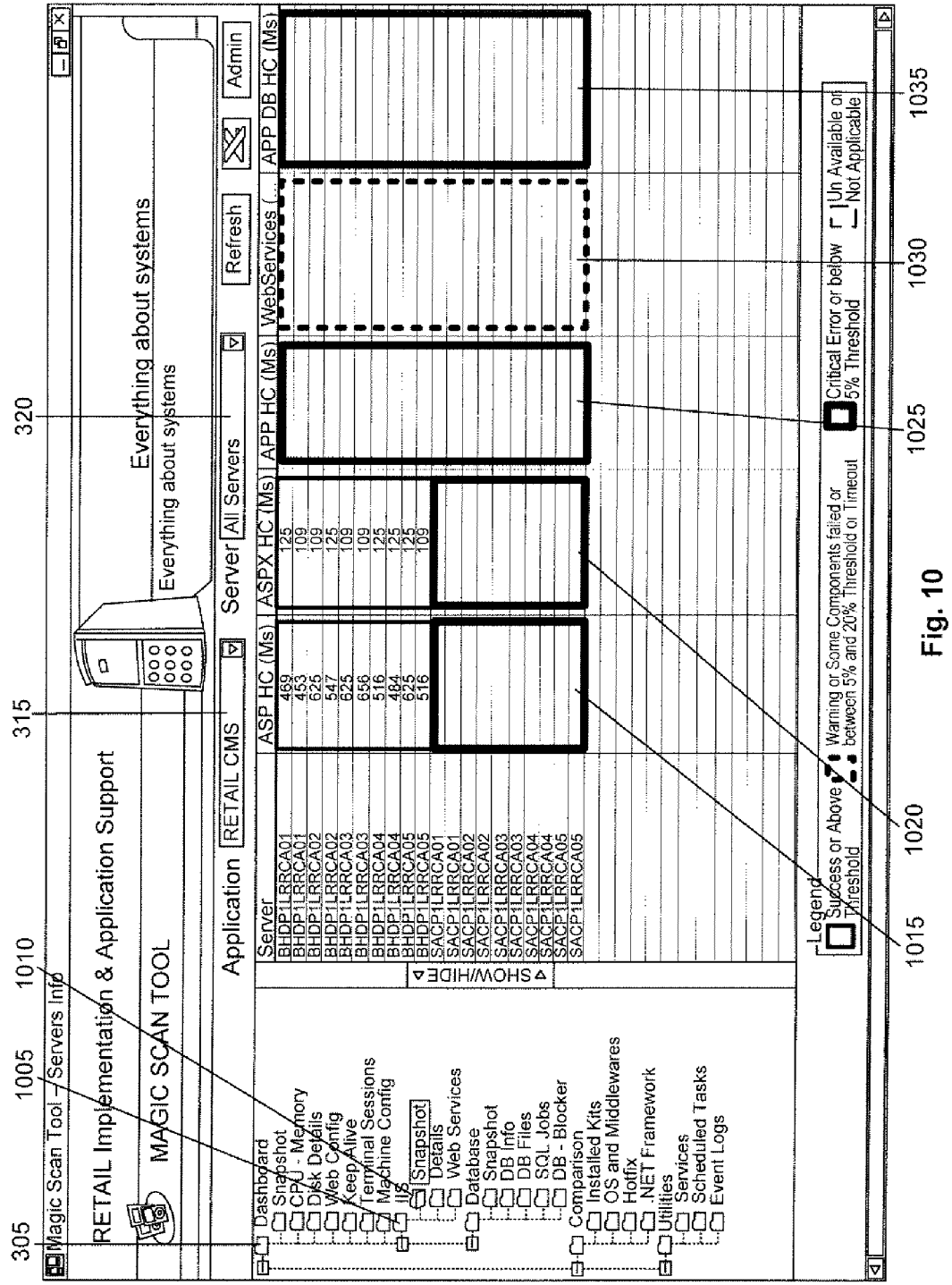
FIG. 10 is a depiction of several IIS snapshot features of a dashboard according to an embodiment.

FIG. 10 is a depiction of further features that appear on the dashboard screen of FIG. 2. In particular, FIG. 10 depicts dashboard menu tree 305 expanded with sub-menu tree "IIS" (i.e., internet information server) 1005 expanded. Activating sub-menu tree IIS 1005 selection "Snapshot" 1010 causes the grid to display IIS snapshot information for the application(s) selected at application drop down-down menu 315 and server(s) selected at server drop-down menu 320. In particular, selecting "Snapshot" 1010 causes five columns to be displayed in addition to the server column, where the columns correspond to active server pages health check ("ASP HC") 1015, active server pages extension health check ("ASPX HC") 1020, application health check ("APP HC") 1025, web services 1030, and application database health check ("APP DB HC") 1035.

FIG. 11 is a depiction of several features of a dashboard according to an embodiment. In particular, FIG. 11 depicts dashboard menu tree 305 partially expanded with sub-menu tree IIS 1005 expanded. Activating sub-menu tree IIS 1005 selection "Details" 1105 causes the grid to display detailed IIS information for the application(s) selected at application drop-down menu 315 and server(s) selected at server drop-down menu 320. In particular, selecting "Details" 1105 causes four columns to be displayed in addition to the server column, where the columns correspond to status (e.g., running or idle) 1110, virtual directory name 1115, directory path 1120, and default page 1125.

Figure 12:
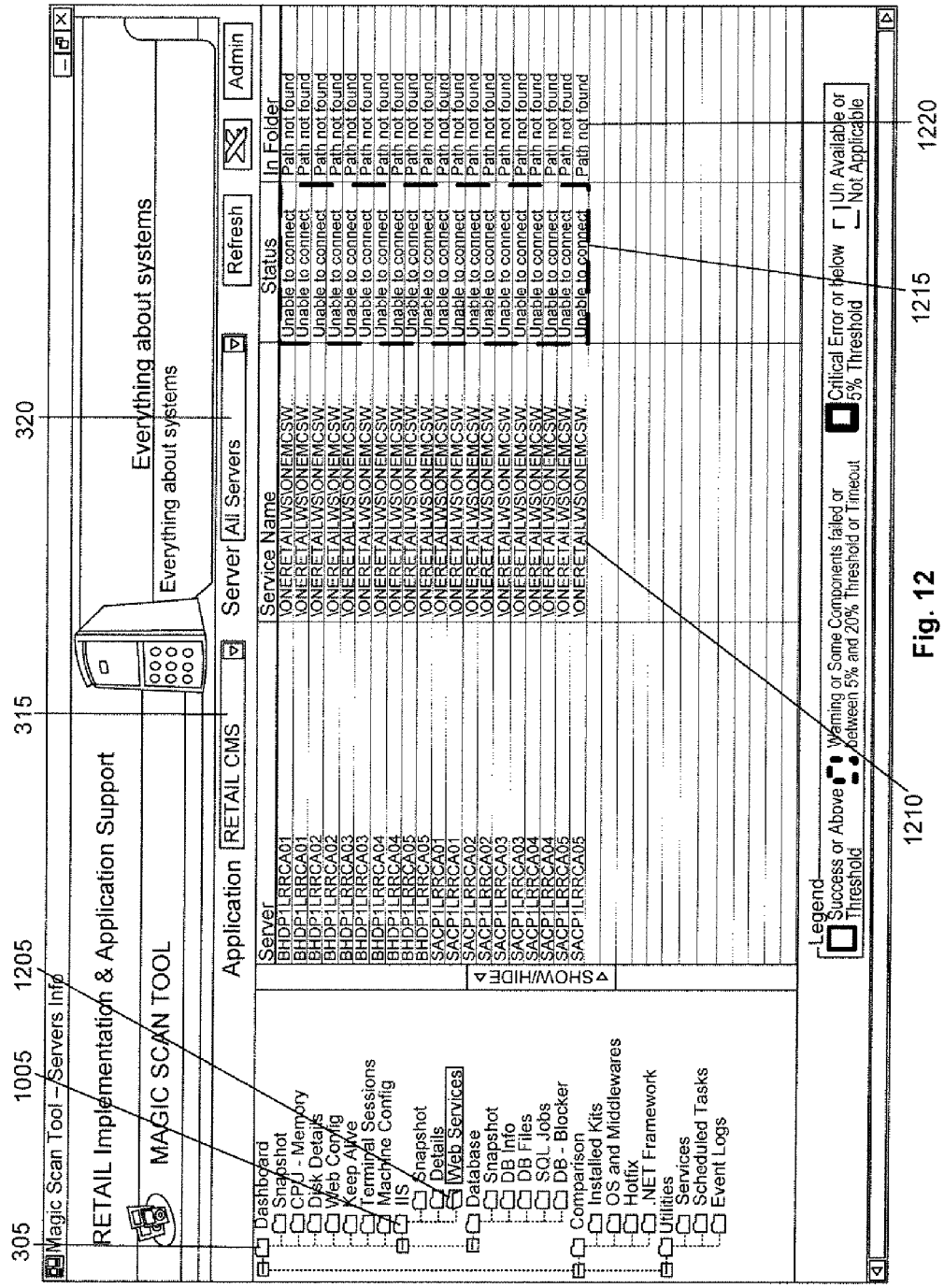
FIG. 12 is a depiction of several IIS web services features of a dashboard according to an embodiment.

FIG. 12 is a depiction of several features of a dashboard according to an embodiment. In particular, FIG. 12 depicts dashboard menu tree 305 expanded with sub-menu tree IIS 1005 expanded. Activating sub-menu tree IIS 1005 selection "Web Services" 1205 causes the grid to display IIS web service information for the application(s) selected at application drop-down menu 315 and server(s) selected at server drop-down menu 320. In particular, selecting "Web Services" 1205 causes three columns to be displayed in addition to the server column, where the columns correspond to service name 1210, status 1215 (e.g., connected or unable to connect), and web services path ("In Folder") 1220.

Figure 13:
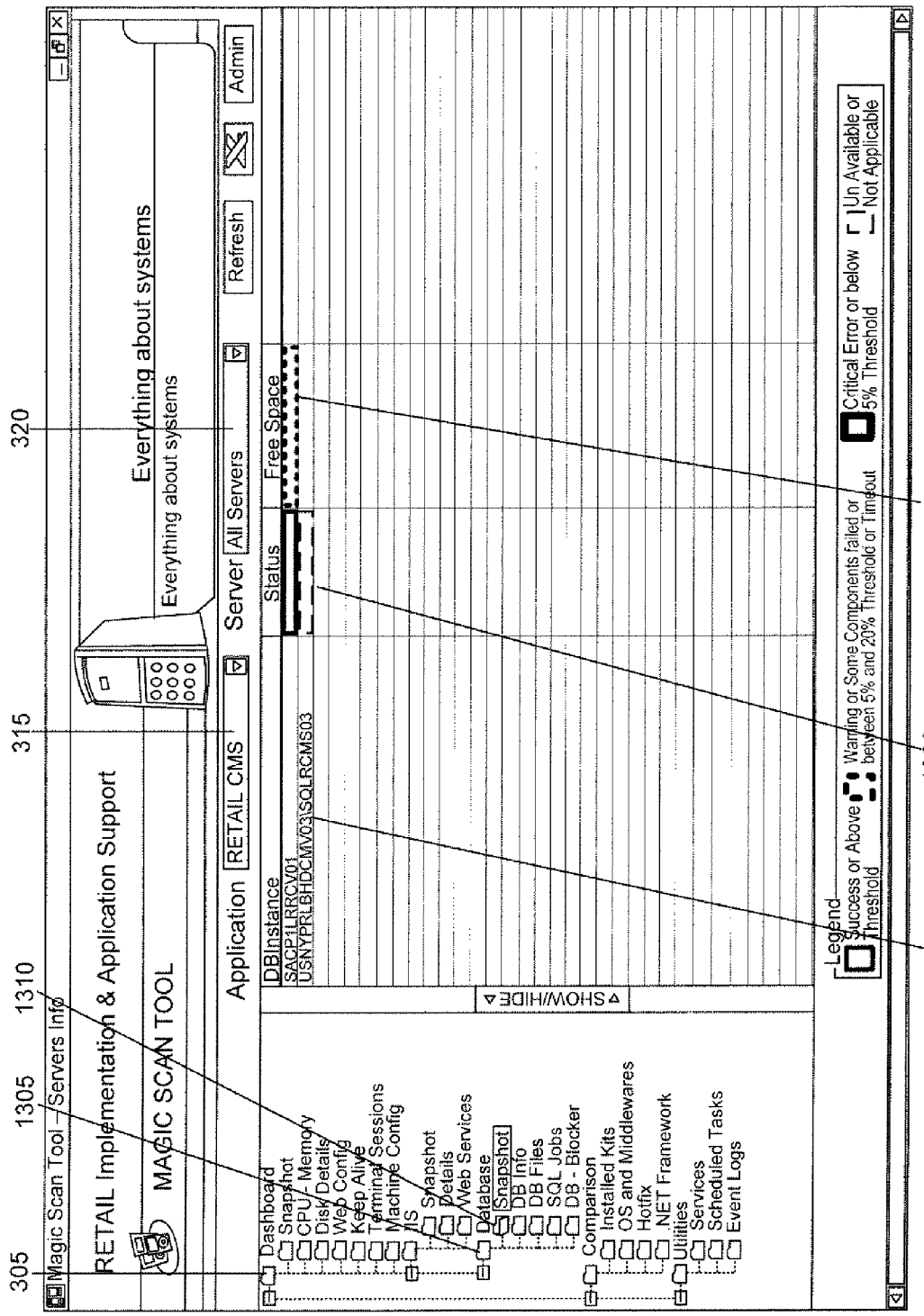
FIG. 13 is a depiction of several database snapshot features of a dashboard according to an embodiment.

FIG. 13 is a depiction of further features that appear on the dashboard screen of FIG. 2. In particular, FIG. 13 depicts dashboard menu tree 305 expanded with sub-menu tree "Database" 1305 expanded. Activating database sub-menu tree 1305 selection "Snapshot" 1310 causes the grid to display database snapshot information for the application(s) selected at application drop-down menu 315 and server(s) selected at server drop-down menu 320. In particular, selecting "Snapshot" 1310 causes three columns to be displayed, where the columns correspond to database instance ("DBInstance") 1315, status 1320, and free space 1325. In certain embodiment, the grid entries may be color coded to display database instance information. For example, a particular database instance grid entry may appear green if the status check is successful, yellow if some component has failed or between 5% and 20% of database instances reach threshold or timeout, red if a critical error occurred or gray if the status is unavailable.

Figure 14:
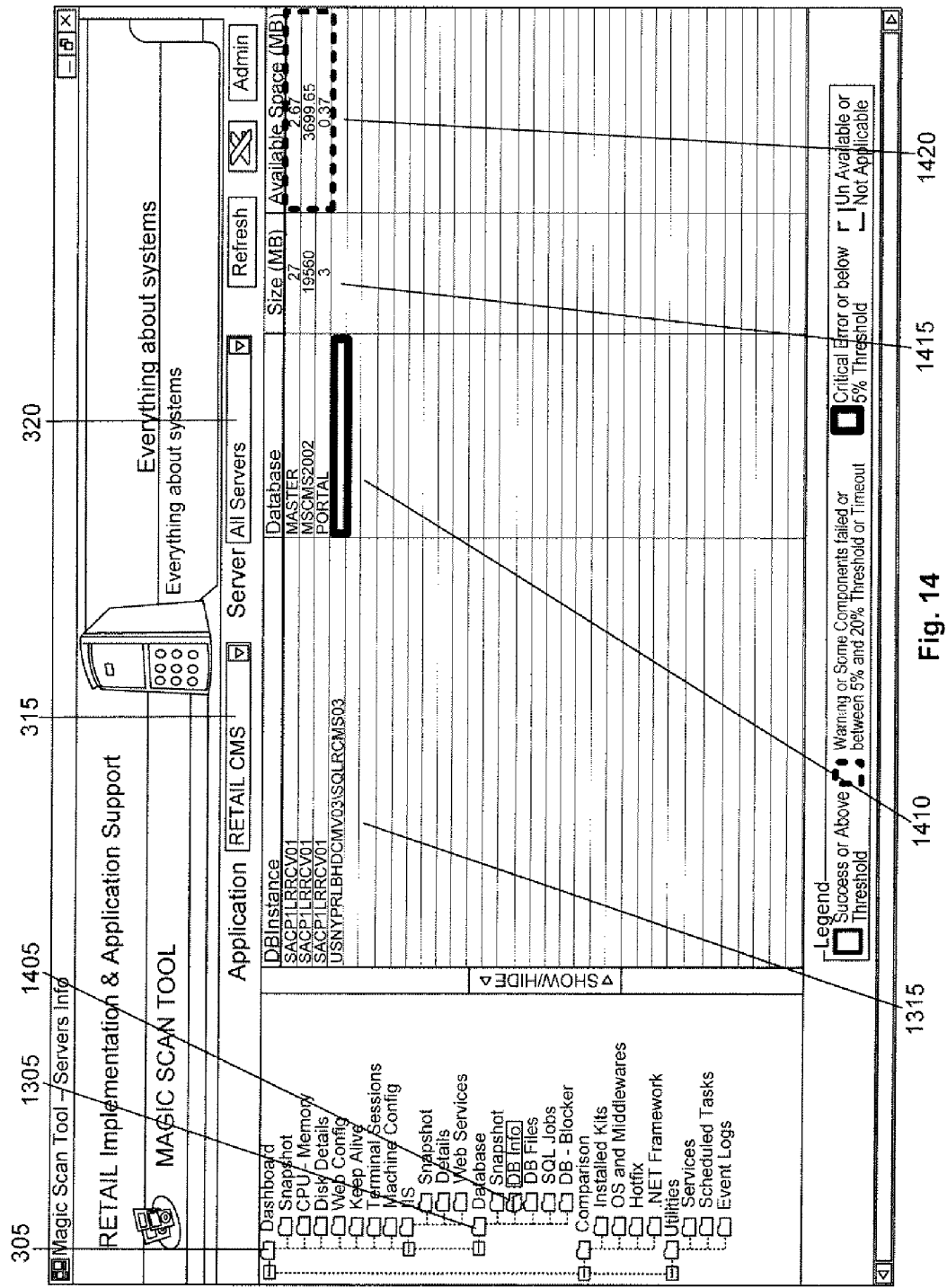
FIG. 14 is a depiction of several database information features of a dashboard according to an embodiment.

FIG. 14 is a depiction of several features of a dashboard according to an embodiment. In particular, FIG. 14 depicts dashboard menu tree 305 expanded with sub-menu tree database 1305 expanded. Activating database sub-menu tree 1305 selection "DB Info" 1405 causes the grid to display general database and database instance information for the application(s) selected at application drop-down menu 315 and server(s) selected at server drop-down menu 320. In particular, selecting "DB Info" 1405 causes four columns to be displayed, where the columns correspond to database instance 1315, database name 1410, size (e.g., in megabytes) 1415 and free space available (e.g., in megabytes) 1420.

Figure 15:
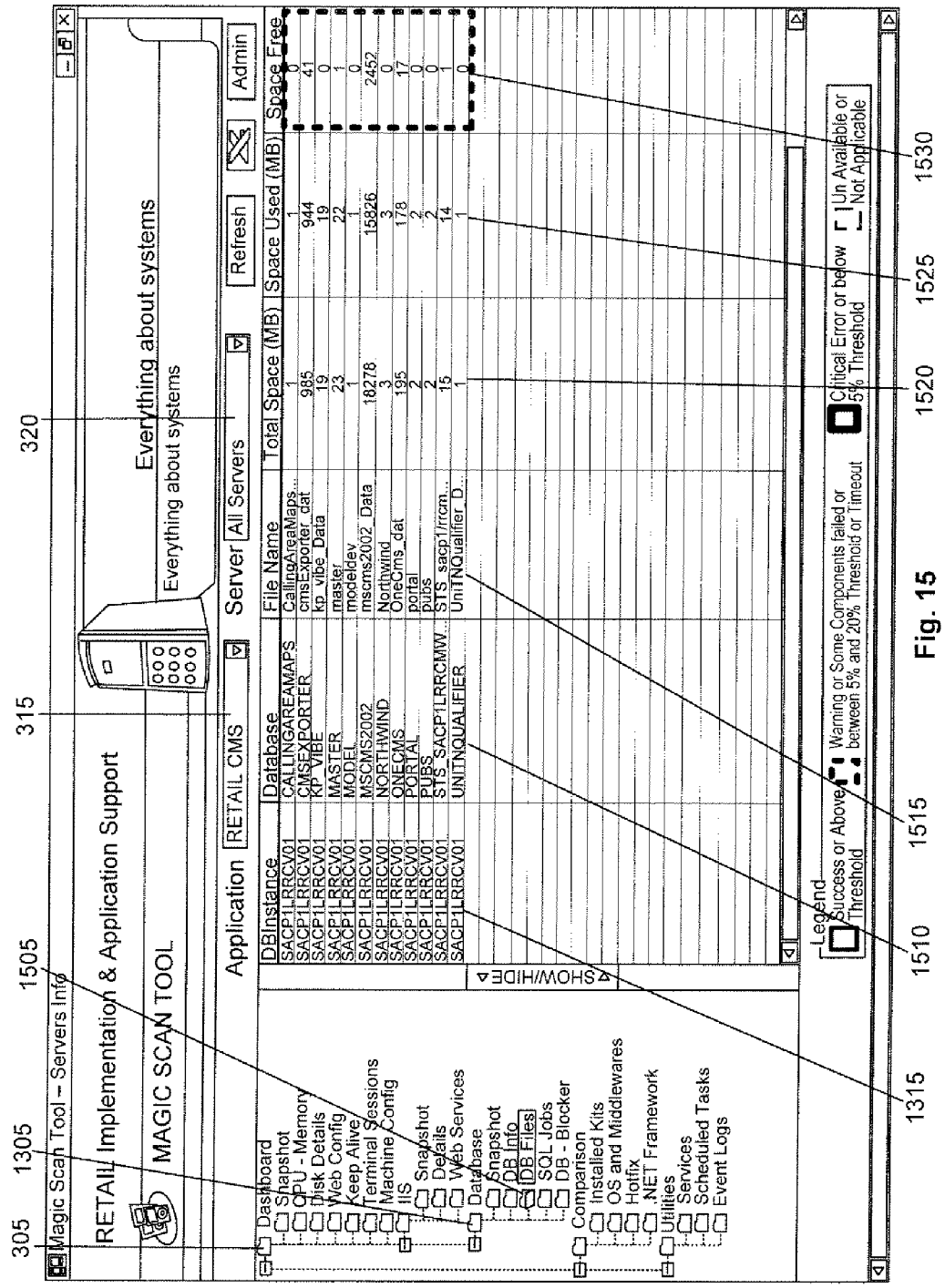
FIG. 15 is a depiction of several database file features of a dashboard according to an embodiment.

FIG. 15 is a depiction of several features of a dashboard according to an embodiment. In particular, FIG. 15 depicts dashboard menu tree 305 expanded with submenu tree database 1305 expanded. Activating database sub-menu tree 1305 selection "DB Files" 1505 causes the grid to display database and database instance file information for the application(s) selected at application drop-down menu 315 and server(s) selected at server drop-down menu 320. In particular, selecting "DB Files" 1505 causes six columns to be displayed, where the columns correspond to database instance 1315, database name 1510, file name 1515, total space (e.g., in megabytes) 1520, space used (e.g., in megabytes) 1525, and space free (e.g., in megabytes) 1530.

Figure 16:
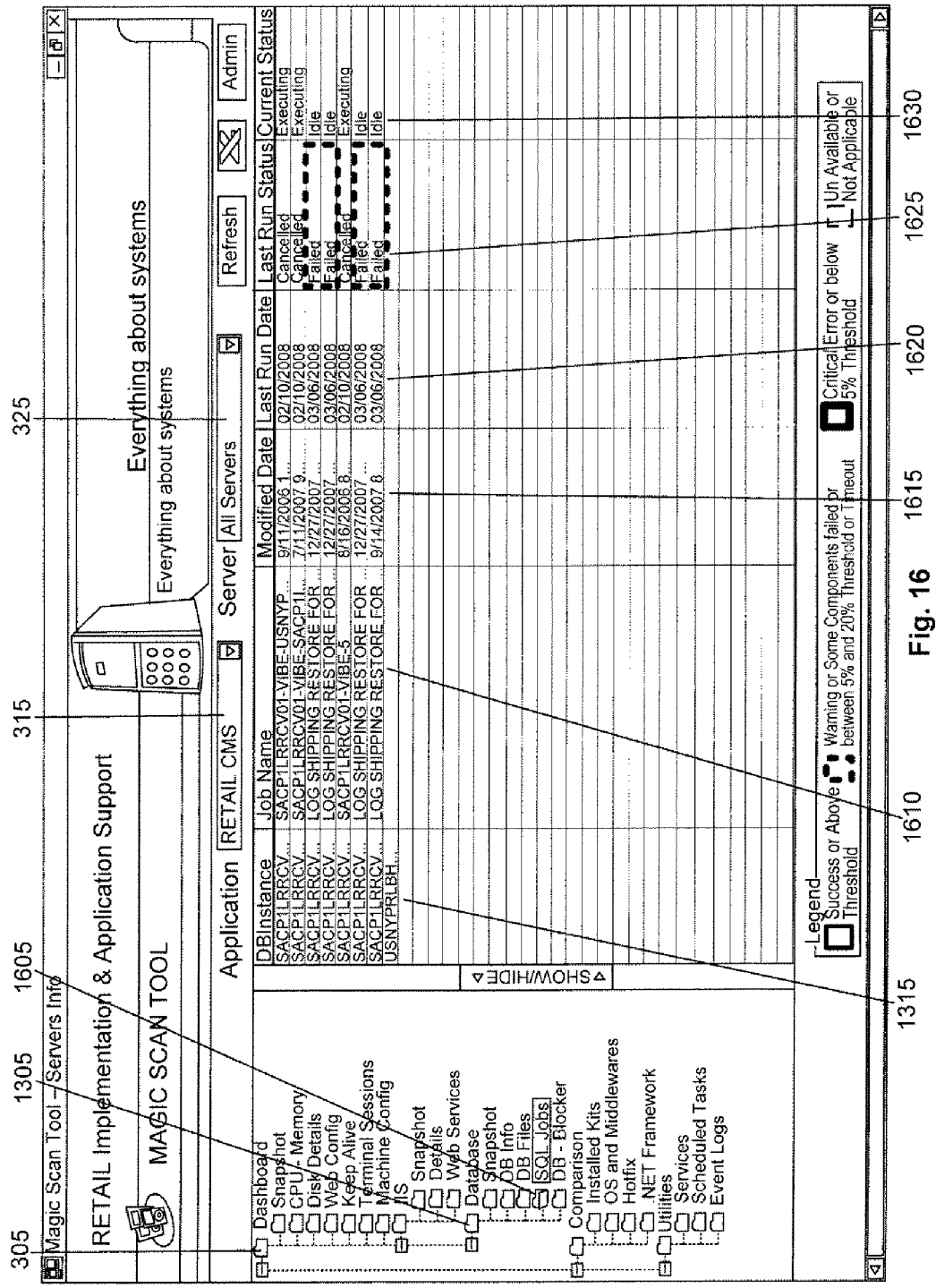
FIG. 16 is a depiction of several database SQL features of a dashboard according to an embodiment.

FIG. 16 is a depiction of several features of a dashboard according to an embodiment. In particular, FIG. 16 depicts dashboard menu tree 305 expanded with sub-menu tree database 1305 expanded. Activating database sub-menu tree 1305 selection "SQL Jobs" 1605 causes the grid to display SQL information for the application(s) selected at application drop-down menu 315 and server(s) selected at server drop-down menu 320. In particular, selecting "SQL Jobs" 1605 causes six columns to be displayed, where the columns correspond to database instance 1315, SQL job name 1610, date last modified (including time) 1615, date last run (including time) 1620, last run status (e.g., succeeded, failed, cancelled or unknown) 1625, and current status (e.g., executing or idle) 1630.

Figure 17:
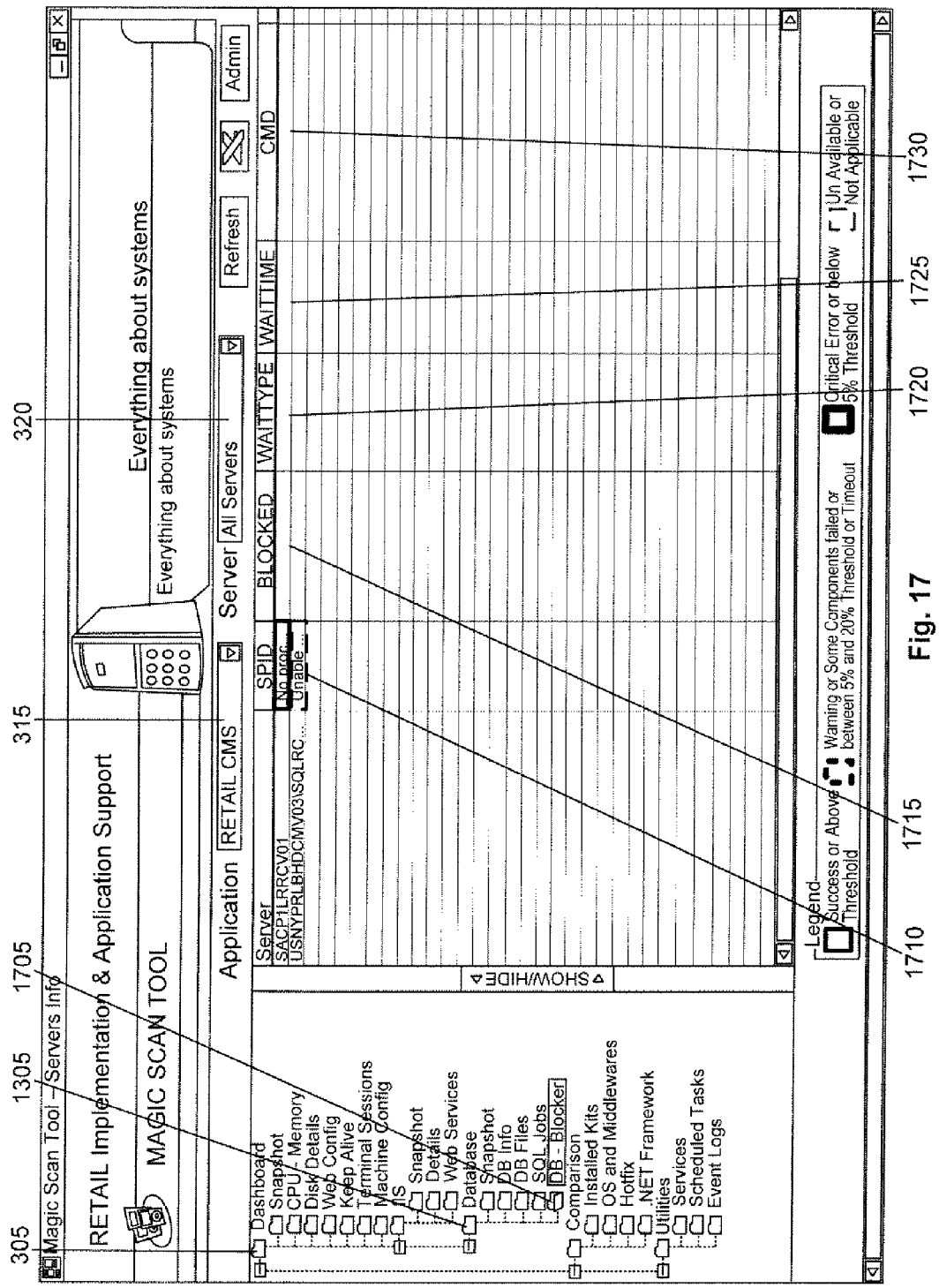
FIG. 17 is a depiction of several database blocker features of a dashboard according to an embodiment.

FIG. 17 is a depiction of several features of a dashboard according to an embodiment. In particular, FIG. 17 depicts dashboard menu tree 305 expanded with sub-menu tree database 1305 expanded. Activating database sub-menu tree 1305 selection "DB-Blocker" 1705 causes the grid to display database blocker information for the application(s) selected at application drop-down menu 315 and server(s) selected at server drop-down menu 320. In particular, selecting "DB-Blocker" 1705 causes five columns to be displayed in addition to the server column, where the columns correspond to service profile identifier ("SPID") 1710, whether the database is blocked 1715, wait type 1720, wait time 1725, and command ("CMD") 1730.

Figure 18:
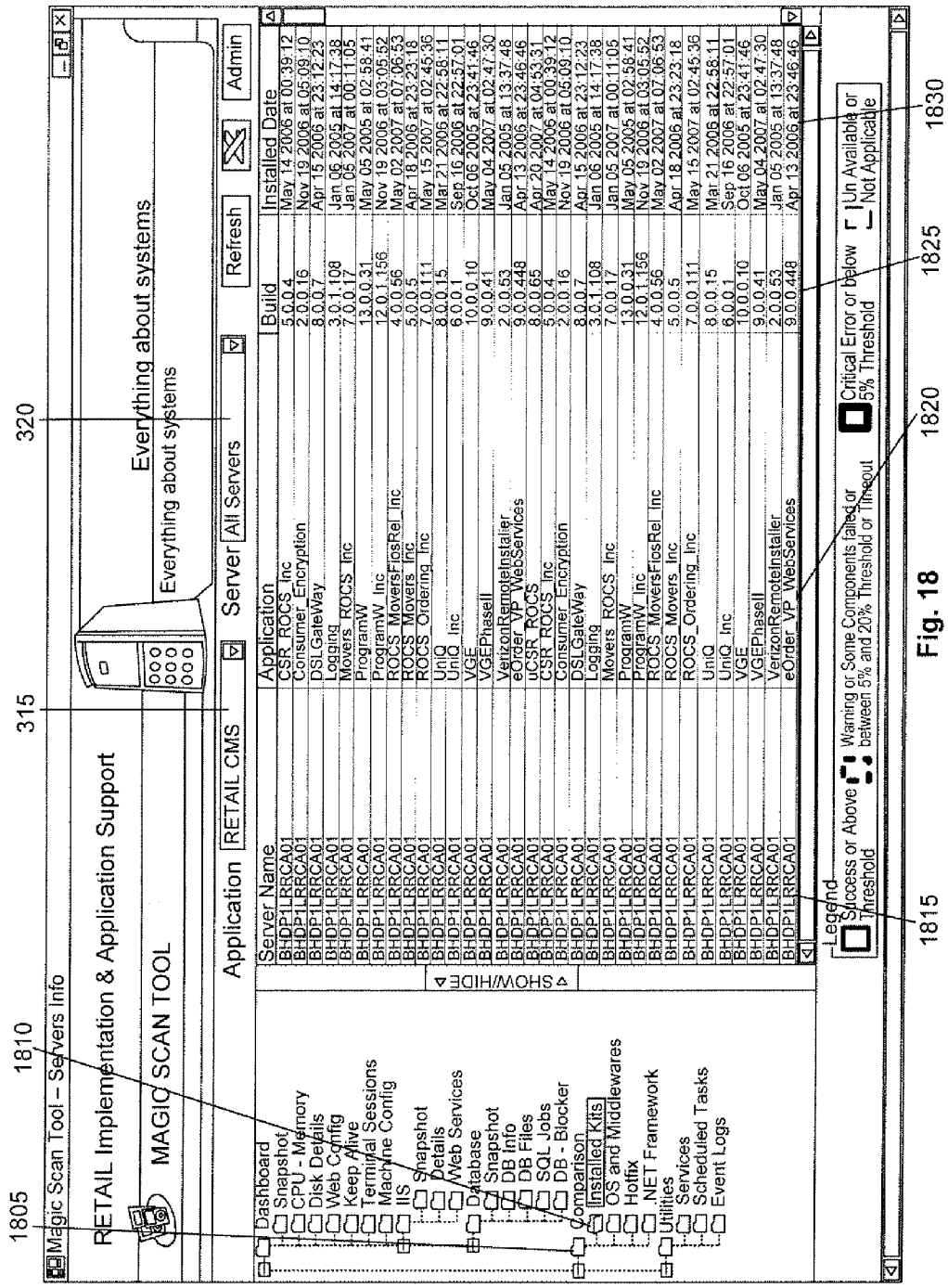
FIG. 18 is a depiction of several installed kit comparison features according to an embodiment.

FIG. 18 is a depiction of several features that appear on the "Comparison" menu tree 1805. In particular, FIG. 18 depicts the comparison menu tree 1805 fully expanded. Activating comparison menu tree 1805 selection "Installed Kits" 1810 causes the grid to display installation information relating to installed kit versions for the application(s) selected at application drop-down menu 315 and server(s) selected at server drop-down menu 320. In particular, selecting "Installed Kits" 1810 causes four columns to be displayed, where the columns correspond to server name 1815, installed application 1820, application version ("Build") 1825, and the application installation date (including time) 1830.

Figure 19:
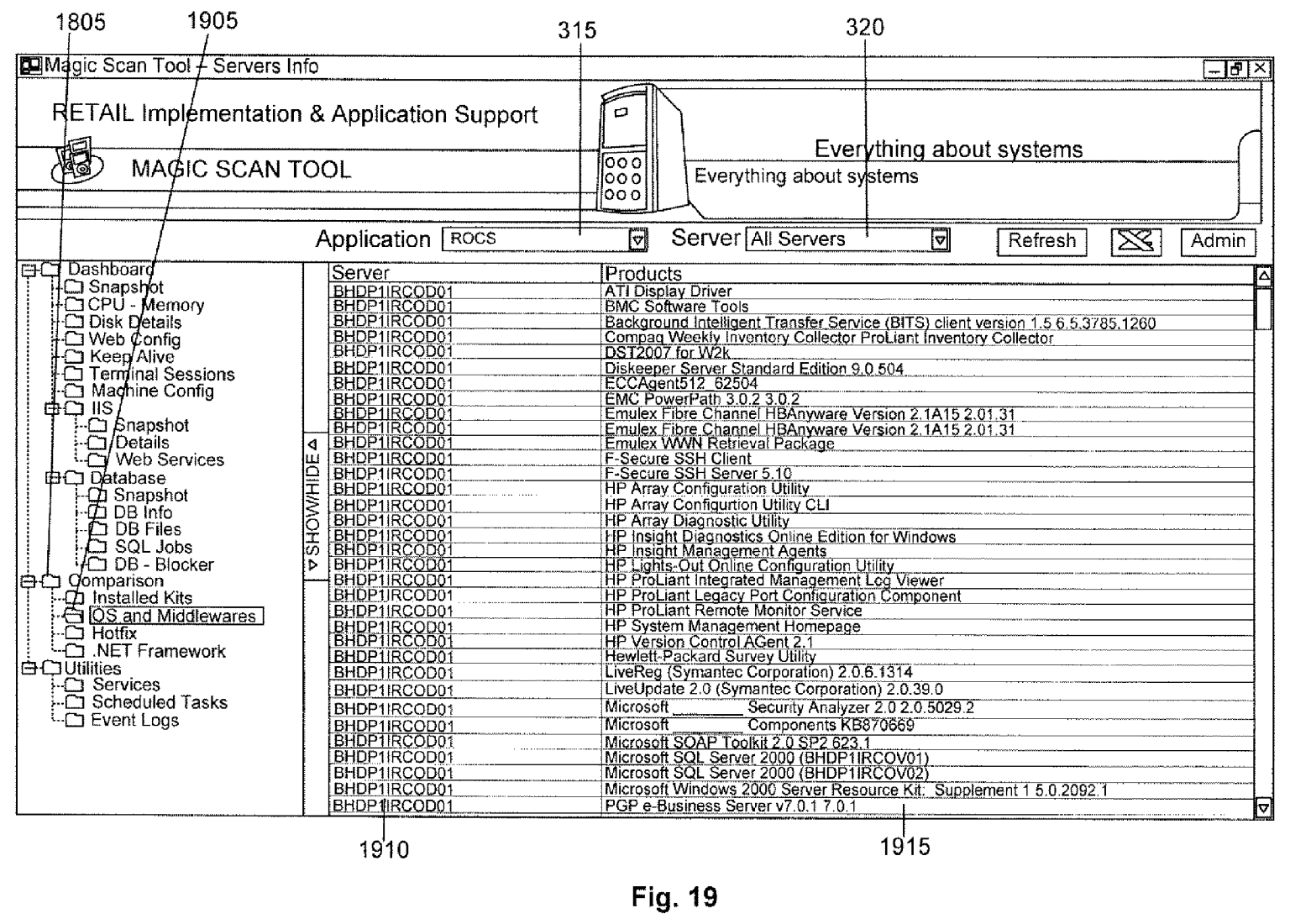

FIG. 19 is a depiction of further features that appear on the comparison menu tree 1805. Activating comparison menu tree 1805 selection "OS and Middlewares" 1905 causes the grid to display operating system and middleware information for the application(s) selected at application drop-down menu 315 and server(s) selected at server drop-down menu 320. In particular, selecting "OS and Middlewares" 1905 causes two columns to be displayed, where the columns correspond to server name 1910 and products (e.g., OS or middleware) 1915.

Figure 20:
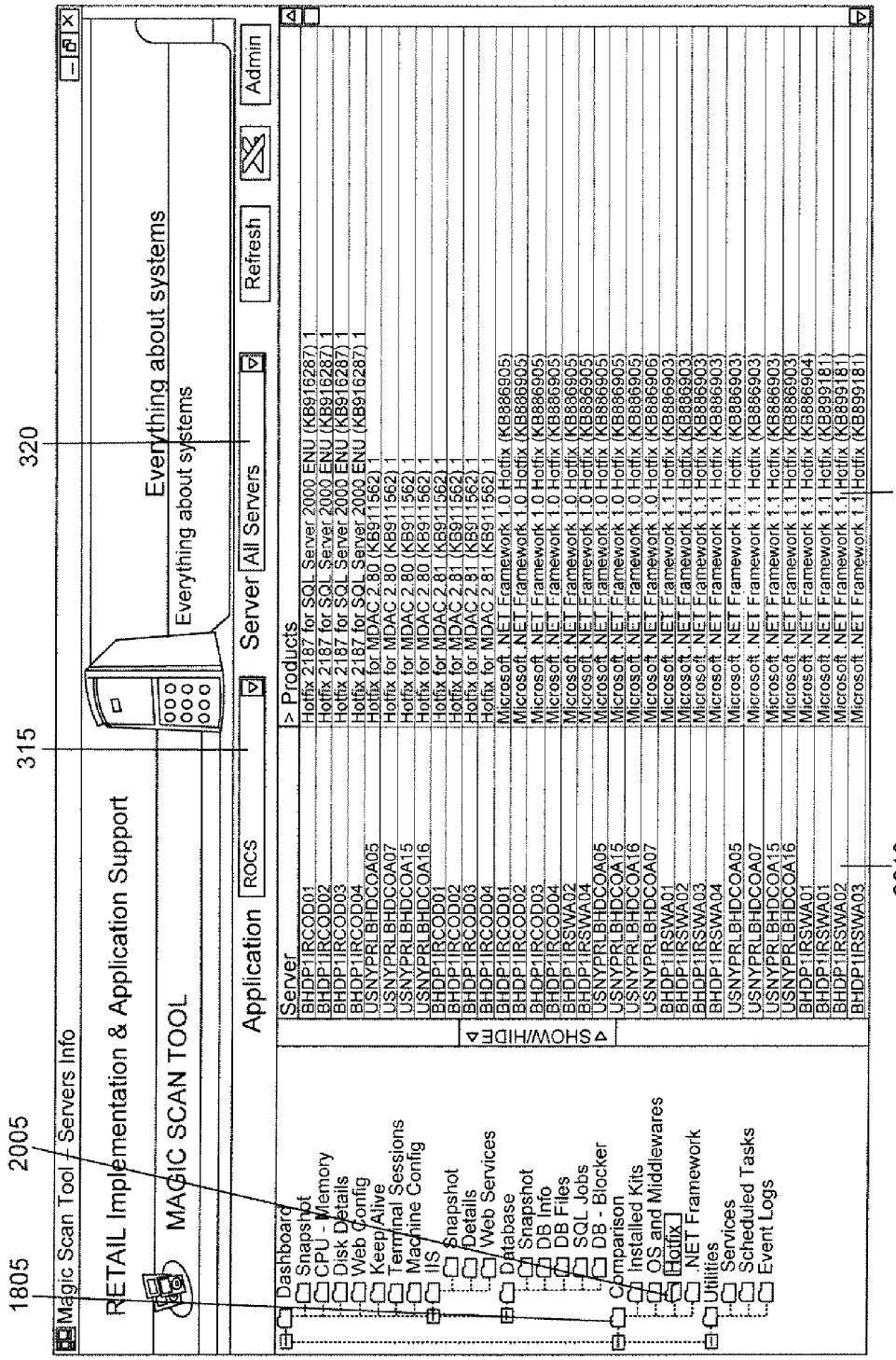
FIG. 20 is a depiction of several hotfix file comparison features according to an embodiment.

FIG. 20 is a depiction of additional features that appear on the comparison menu tree 1805. Activating comparison menu tree 1805 selection "Hotfix" 2005 causes the grid to display installed hotfixes for the application(s) selected at application drop-down menu 315 and server(s) selected at server drop-down menu 320. In particular, selecting "Hotfix" 2005 causes two columns to be displayed, where the columns correspond to server name 2010 and installed hotfix files ("Products") 2015.

Figure 21:
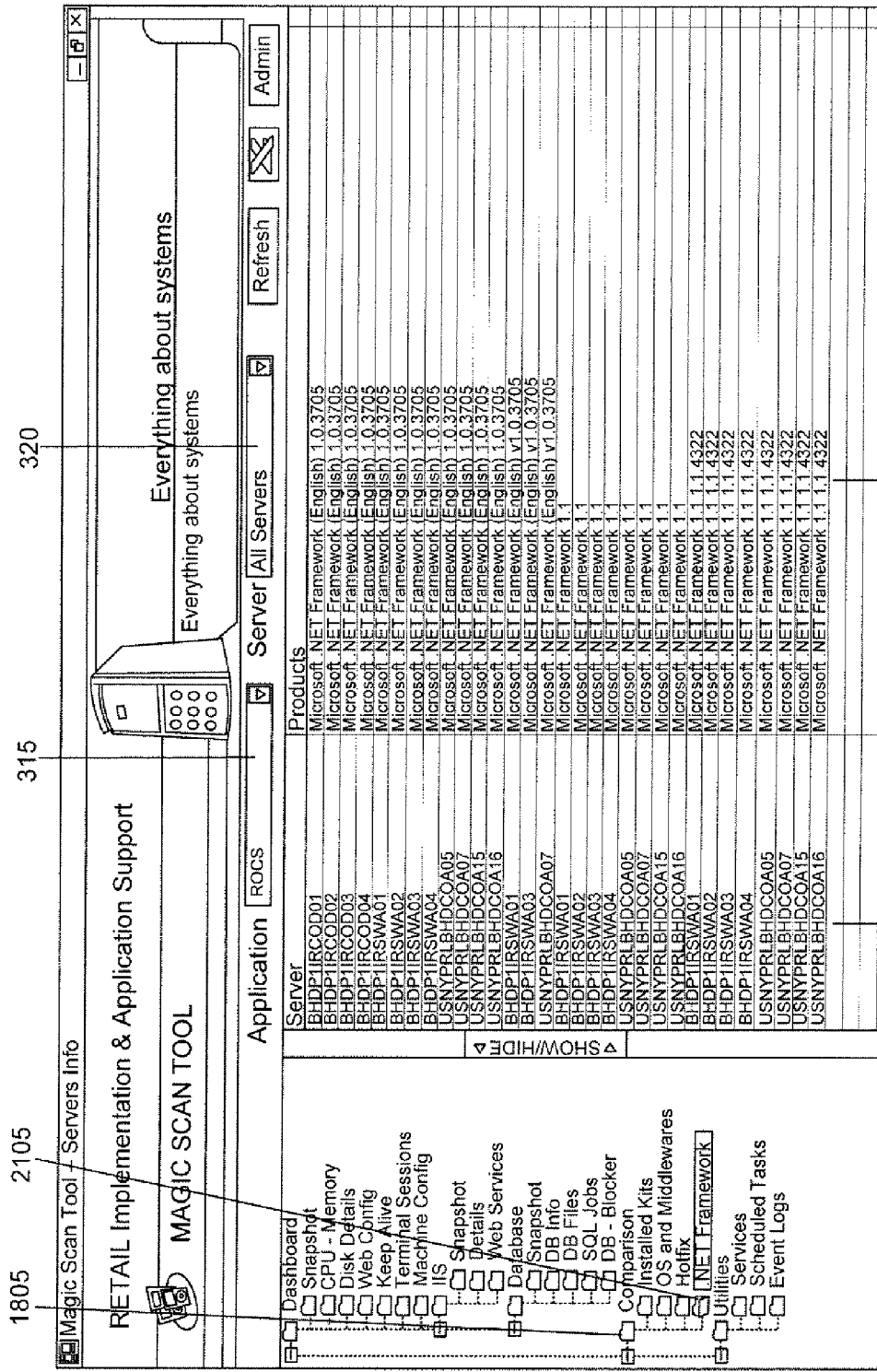
FIG. 21 is a depiction of .NET framework comparison features according to an embodiment.

FIG. 21 is a depiction of several features that appear on the comparison menu tree 1805. Activating comparison menu tree 1805 selection ".NET Framework" 2105 causes the grid to display installed .NET frameworks for the application(s) selected at application drop-down menu 315 and server(s) selected at server drop-down menu 320. In particular, selecting ".NET Framework" 2105 causes two columns to be displayed, where the columns correspond to server name 2110 and installed .NET framework version ("Products") 2115.

FIG. 22 is a depiction of several features that appear on the "Utilities" menu tree 2205. In particular, FIG. 22 depicts the utilities menu tree 2205 fully expanded. Activating utilities menu tree 2205 selection "Services" 2210 causes the grid to display utility service information for the application(s) selected at application drop-down menu 315 and server(s) selected at server drop down menu 320. Selecting "Services" 2210 causes four columns to be displayed, where the columns correspond to service name 2215, service type (e.g., automatic, manual or disabled) 2220, service description 2225, and service status (e.g., stopped or running) 2230. By right clicking, a service may be started, stopped, restarted, and refreshed.

Figure 23:
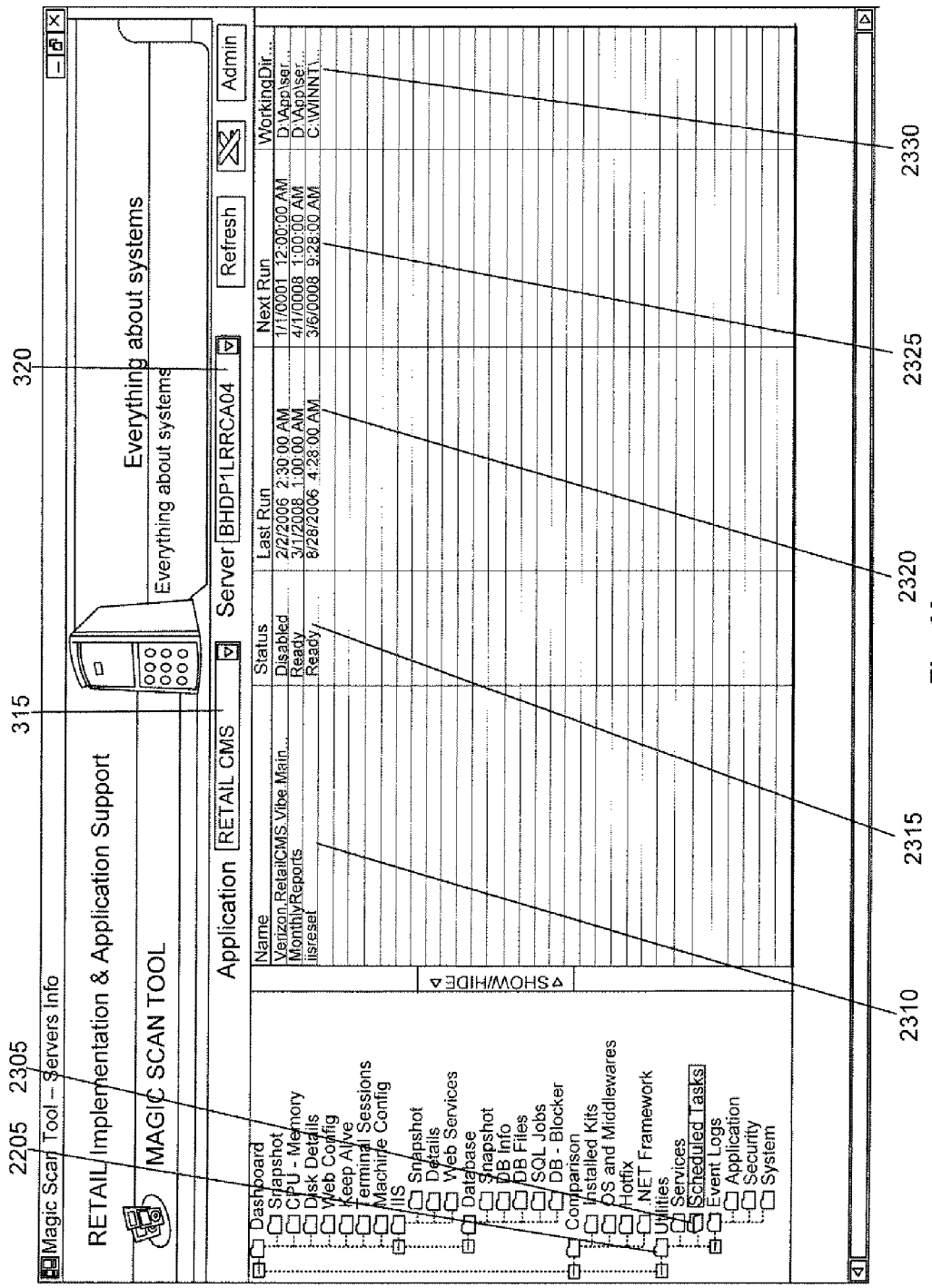
FIG. 23 is a depiction of scheduled task utilities features according to an embodiment.

FIG. 23 is a depiction of further features that appear on the utilities menu tree 2205. Activating utilities menu tree 2205 selection "Scheduled Tasks" 2305 causes the grid to display task information for the application(s) selected at application drop-down menu 315 and server(s) selected at server drop-down menu 320. In particular, selecting "Scheduled Tasks" 2305 causes five columns to be displayed, where the columns correspond to task name 2310, status (e.g., disabled or ready) 2315, last task run (including date and time) 2320, next task run (including date and time) 2325, and the file system associated with each task ("WorkingDirectory") 2330. By right clicking, a scheduled task may be run or killed.

Figure 24:
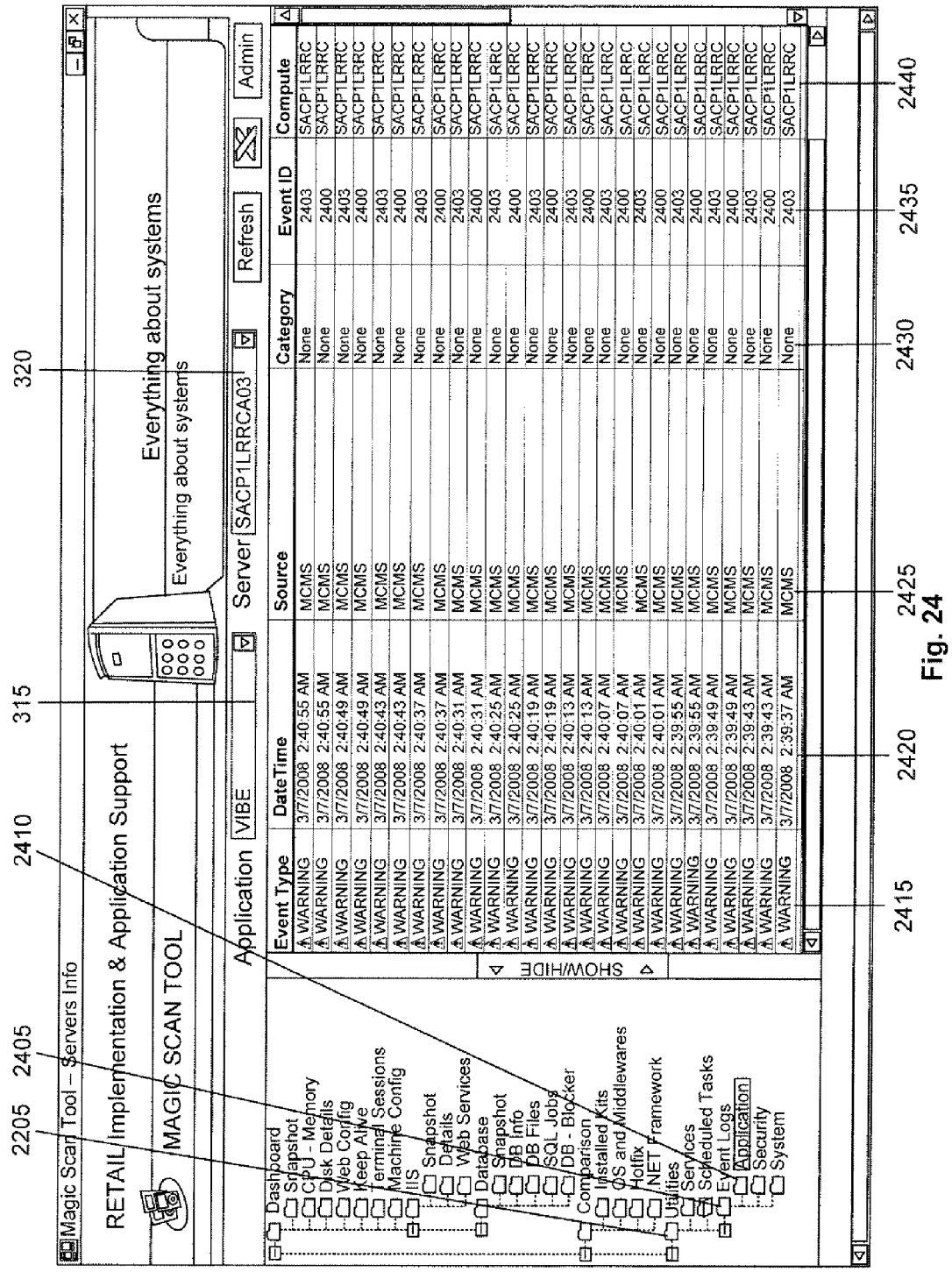
FIG. 24 is a depiction of application event log utilities features according to an embodiment.

FIG. 24 is a depiction of additional features that appear on the utilities menu tree 2205. In particular, FIG. 24 depicts utilities menu tree 2205 expanded with sub-menu tree "Event Logs" 2405 expanded. Activating sub-menu tree event logs 2405 selection "Application" 2410 causes the grid to display event log application information for the application(s) selected at application drop down menu 315 and server(s) selected at server drop down menu 320. Selecting "Application" 2410 causes six columns to be displayed, where the columns correspond to event type 2415, date and time 2420, source 2425, category 2430, event identification 2435, and Computer 2440. By right clicking, a user may view the event log application description.

FIGS. 25-29 provide depictions of an interface for a configuration process according to certain exemplary embodiments. The exemplary configuration process may begin by installing software on each server and initially configuring each server and application, which may be done separately. The configured application(s) and server(s) may then be associated to each other. Additional information may be provided via the exemplary interfaces by entering the appropriate server(s), application(s), application path(s), virtual directory, keep alive path(s), drive(s), and machine configuration path(s). Once configured, the server(s) and application(s) may become available in diagnostic tool 200, as depicted in FIG. 2, by interacting with one or more configuration .txt files, which may be stored on one or more servers. More particularly, the .txt files may be accessed in order to determine the locations of information that is retrieved and displayed by diagnostic tool 200. As discussed in detail below in reference to FIGS. 25-29, embodiments may store information regarding each server and/or application in one or more text (.txt) files, which may be stored locally to such servers and/or applications. The screens depicted in FIGS. 2-24 may display relevant information by retrieving such text files and using them to identify where relevant information is stored.

The configuration process may be implemented by storing configuration information in one or more .txt files, which may be stored on a server or a combination of servers. A .txt file may be easily accessed by any program that reads text, may be platform independent, and may be written in ASCII. The .txt files may gather information regarding server(s), database(s), application(s), or any other network device or data. In one exemplary embodiment, a user may use diagnostic tool 200, as depicted in FIG. 2, to access .txt files located on one or more servers in order to retrieve information of the type depicted in FIGS. 2-24.

By way of a non-limiting example, a user may cause .txt files to be created and stored on server(s) by using the exemplary interfaces depicted in FIGS. 25-29. In one exemplary embodiment, a user may view the CPU-memory information of server(s) as depicted in FIG. 4. A user may access such information by directing diagnostic tool 200 to interact with the installed .txt files in order to retrieve the desired information located on the server(s). Software according to the exemplary embodiment under discussion may install any number of .txt files on any number of servers and may access such .txt files from any network server or from a remote access point. In general, the .txt files may reside on a single domain, which may allow any resource on such domain to access the .txt files. According to one exemplary embodiment, a user may direct diagnostic tool 200 to simultaneously interact with .txt files located on a plurality of servers in order to simultaneously retrieve information from such servers.

Figure 25:
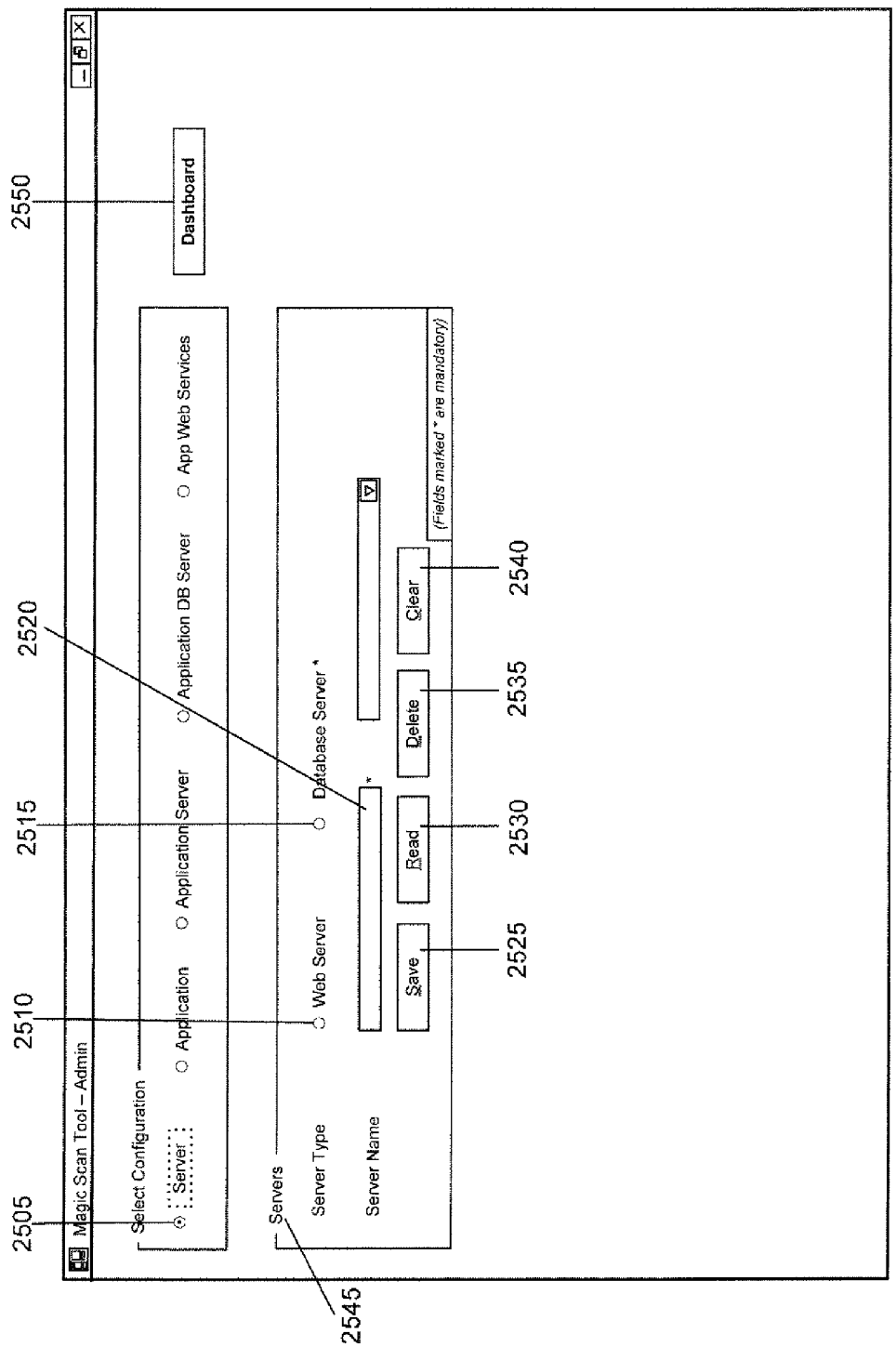
FIG. 25 is a depiction of server configuration according to an embodiment.

FIG. 25 depicts a step in the exemplary configuration process according to the embodiment under discussion. In particular, FIG. 25 depicts a process used to associate a server name with software. By clicking Dashboard button 2550, a user may return to diagnostic tool 200 depicted in FIG. 2. By way of a non-limiting example, server selection radio button 2505 may be selected to present server configuration window 2545 to a user. Additionally, a user may select either web server selection radio button 2510 or database server selection radio button 2515 in order to identify the type of server being configured. Once server type 2510 or 2515 is selected, a user may enter a server name into server name text box 2520 and direct the configuration process to save 2525, read 2530, delete 2535, or clear 2540 the information. A user may click save 2525 to cause individual server names to be available for the server/application association process depicted in FIG. 27. The information entered in FIG. 25 may be stored in .txt file(s), which may be stored on server(s). A user may direct any number of .txt file(s) to be stored on any number of server(s).

Figure 26:
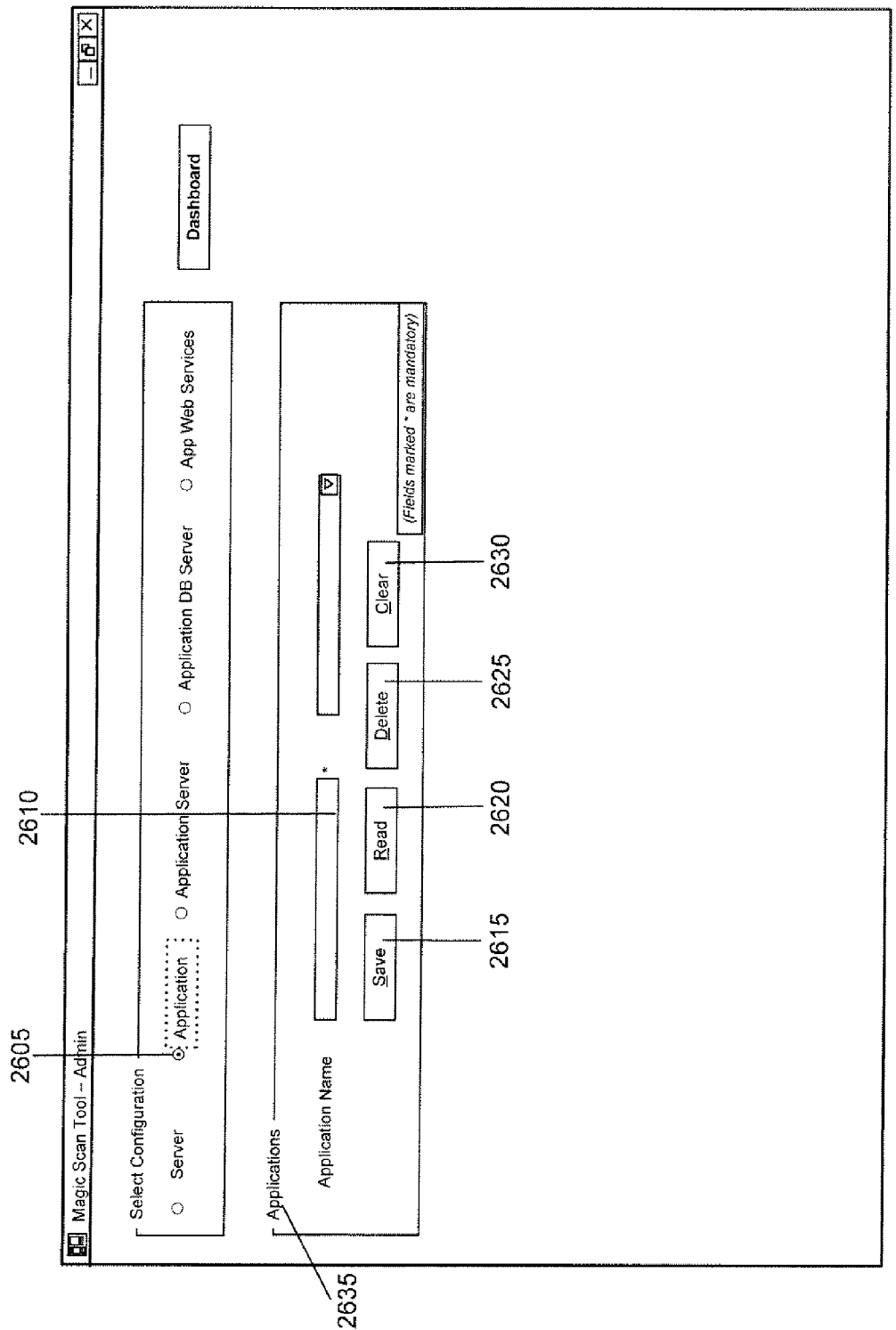
FIG. 26 is a depiction of an application configuration screen according to an embodiment.

FIG. 26 is a depiction of an additional step in the exemplary configuration process according to the embodiment under discussion. In particular, FIG. 26 depicts a process to associate an application name with software. By way of a non-limiting example, application selection radio button 2605 may be selected to present application configuration window 2635 to a user. Additionally, a user may enter an application name into application name text box 2610 and direct the configuration process to save 2615, read 2620, delete 2625, or clear 2630 the information. A user may click save 2615 to cause individual application names to be available for the server/application association process depicted in FIG. 27. The information entered in FIG. 26 may be stored in .txt file(s), which may be stored on server(s). A user may direct any number of .txt file(s) to be stored on any number of server(s).

Figure 27:
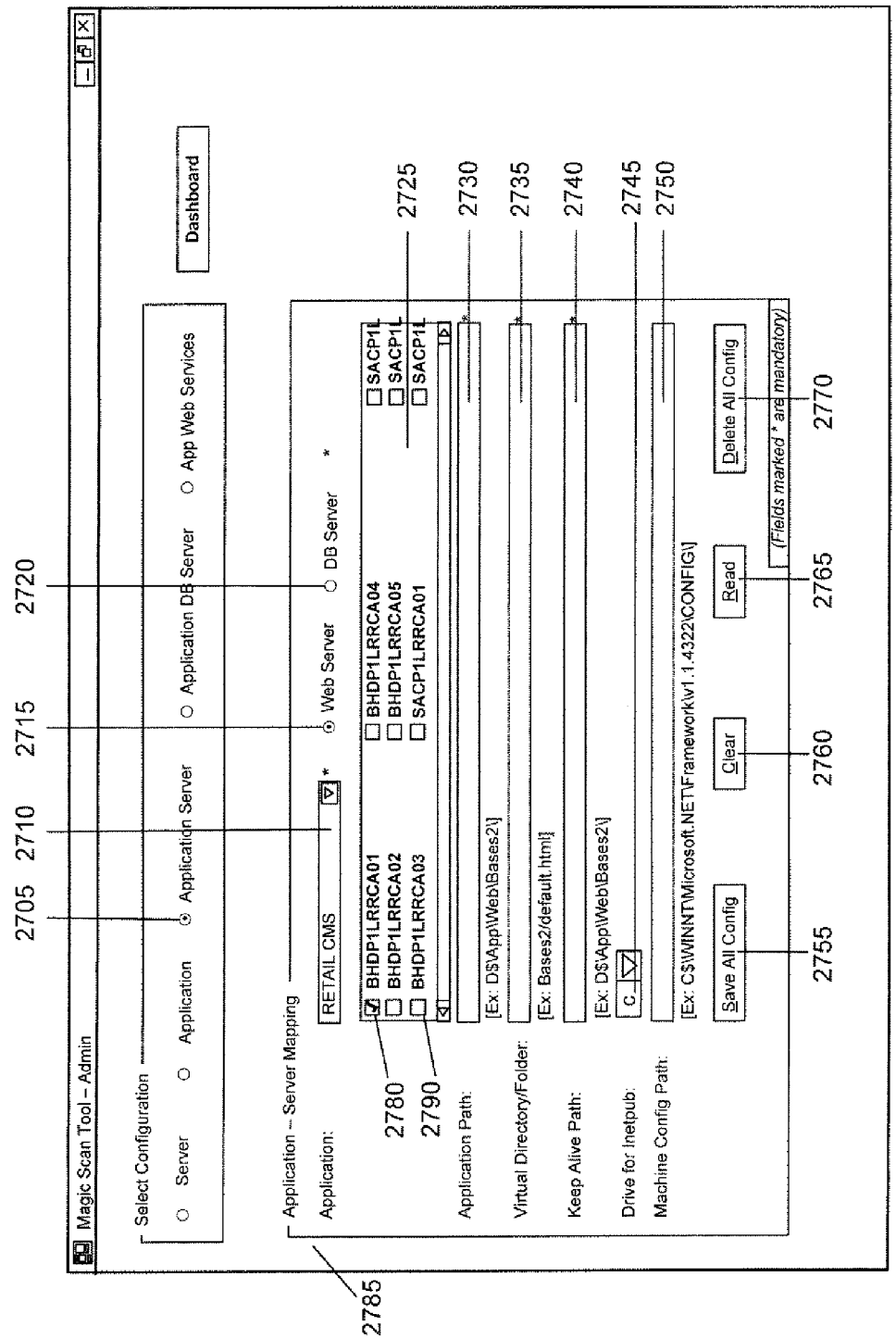
FIG. 27 is a depiction of an application and server mapping configuration screen according to an embodiment.

FIG. 27 is a depiction of an additional step in the exemplary configuration process according to the embodiment under discussion. In particular, FIG. 27 depicts a process to associate application(s) with server(s). By way of a non-limiting example, application server radio button 2705 may be selected to present application-server mapping window 2785 to a user. Additionally, web server selection radio button 2715 or database server selection radio button 2720 may be selected to cause the corresponding server names 2780 and 2790 to be displayed in server name window 2725. According to this exemplary embodiment, a user may also select an application from application pull-down menu 2710 and select server name(s) 2785, 2790 in order to continue the configuration process. Additionally, information corresponding to the application path 2730, virtual directory 2735, keep alive path 2740, drive 2745, and machine configuration path 2750 may be entered into application-server mapping window 2785. After all mapping information is entered, a user may select save all configuration button 2755 in order to cause the named server(s) 2780 and 2790 to be mapped to the named application 2710. Accordingly, the named server(s) and application(s) may be written onto a .txt file and may become available on the diagnostic utility screen 200 depicted in FIG. 2. The information entered in FIG. 27 may be stored in .txt file(s), which may be stored on server(s). A user may direct any number of .txt file(s) to be stored on any number of server(s).

Figure 28:
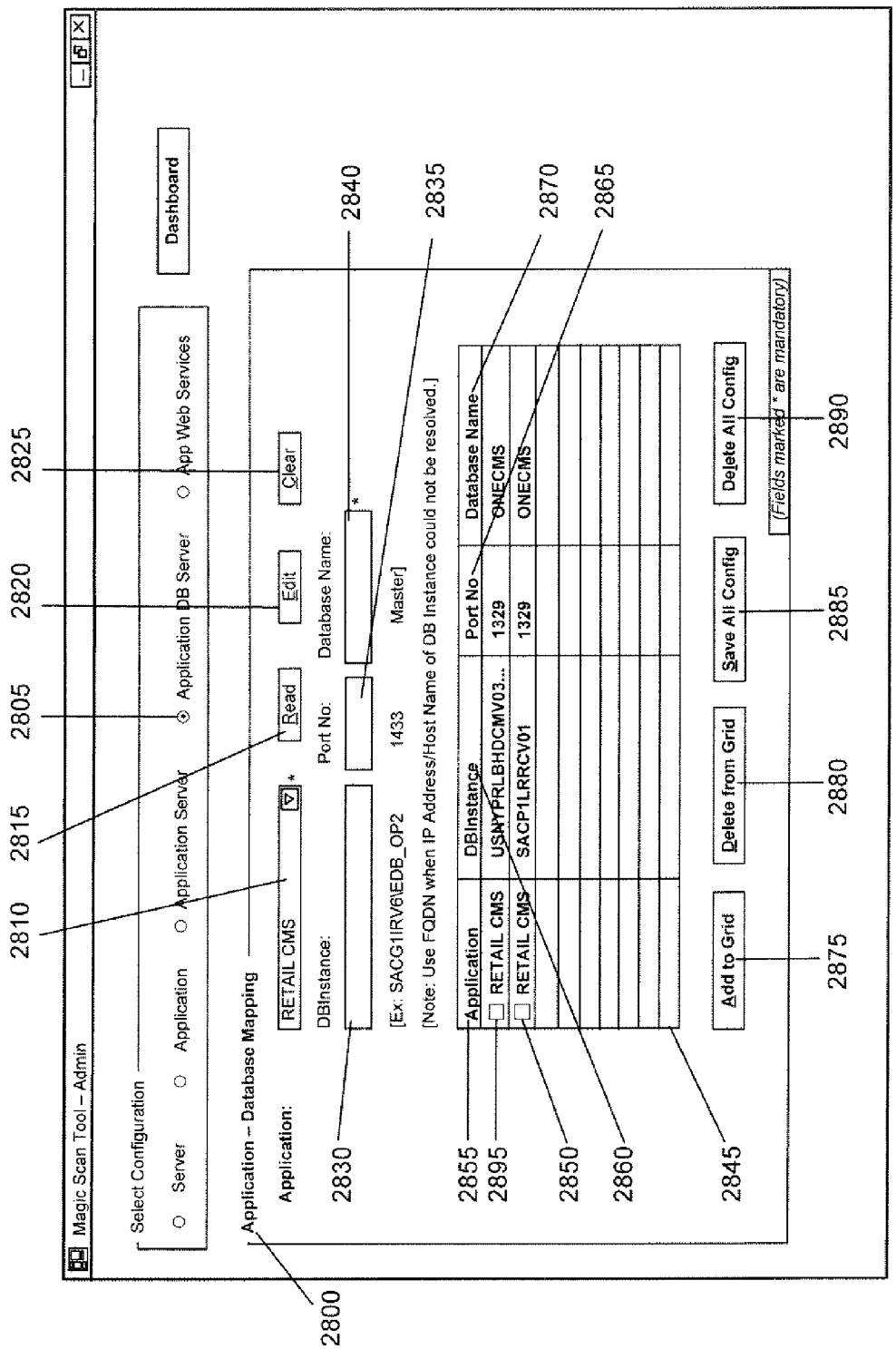
FIG. 28 is a depiction of an application and database instance mapping configuration screen according to an embodiment.

FIG. 28 is a depiction of an additional step in the exemplary configuration process according to the embodiment under discussion. In particular, FIG. 28 depicts a process used to associate application(s) with database instance(s). In some embodiments, database instances refer to the shared memory structures and background processes that run a cluster of databases. By way of a non-limiting example, a user may select application database server radio button 2805 in order to present application-database mapping window 2800. Within application-database mapping window 2800, a user may select an application from application pull-down menu 2810 and direct the configuration to read 2815, edit 2810, or clear 2825 the application. Additionally, a user may enter database instance information into database instance text box 2830, port number text box 2835, and database name text box 2840. Once information is entered, a user may add to grid 2875, delete from grid 2880, save all configurations 2885, and delete all configurations 2890. By selecting add to grid button 2875, a user may cause the database instance information to be displayed on grid 2845. Additionally, a user may select database instances 2850, 2895 and click save all configuration button 2885 in order to cause the named database instance(s) to be associated with the named application(s) and server(s). Accordingly, the named database instance(s) will become available on the diagnostic utility screen 200 depicted in FIG. 2. The information entered in FIG. 28 may be stored in .txt file(s), which may be stored on server(s). A user may direct any number of .txt file(s) to be stored on any number of server(s).

Figure 29:
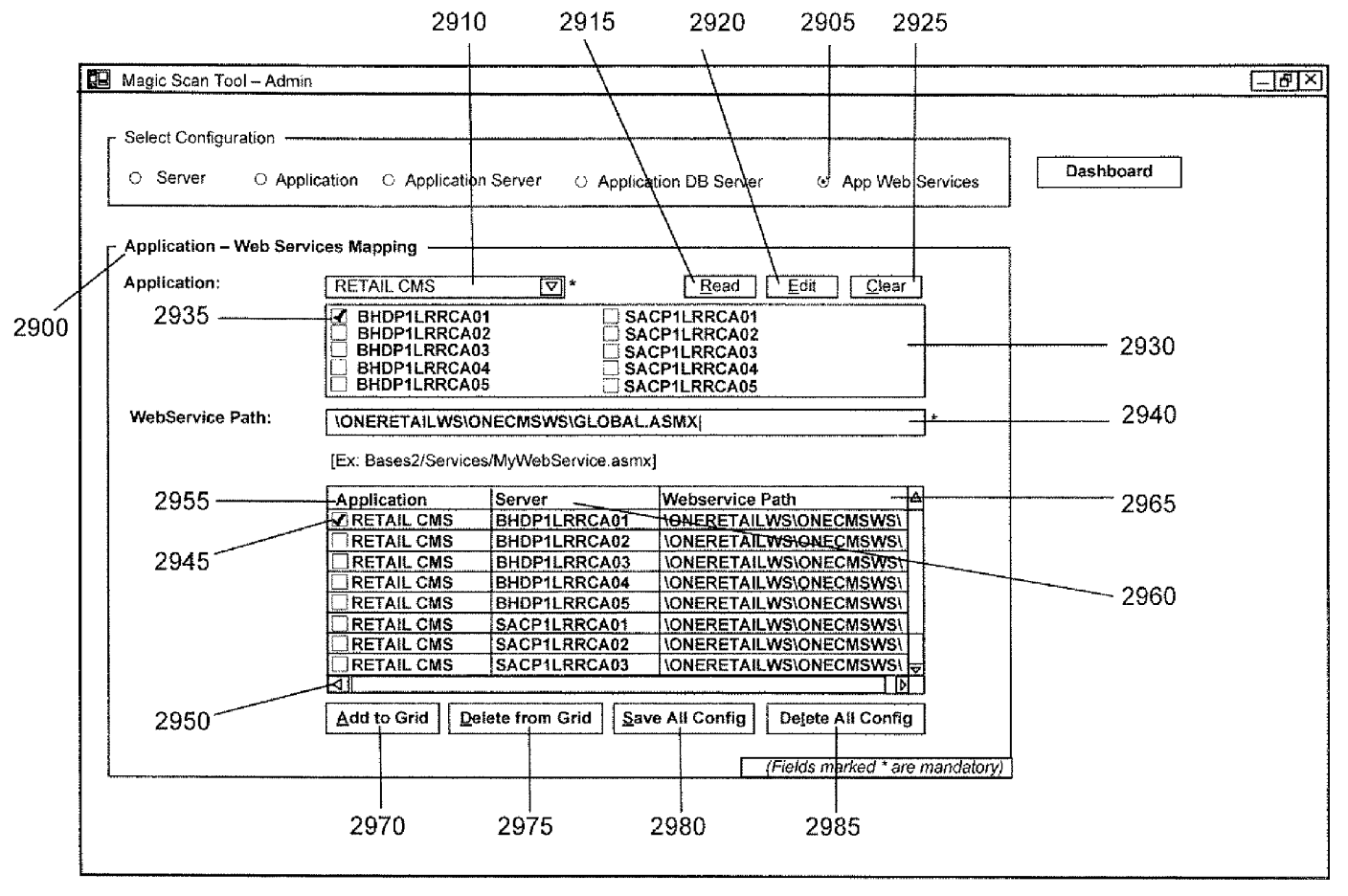

FIG. 29 is a depiction of an additional step in the configuration process according to the embodiment under discussion. In particular, FIG. 29 depicts a process used to associate application(s) with web service(s). In some embodiments, a web service is a software system designed to support interoperable machine to machine interaction over a network. By way of a non-limiting example, application web services radio button 2905 may be selected in order to present application-web services mapping window 2900 to a user. Within application-web services mapping window 2900, a user may select an application from application pull-down menu 2910 and direct the configuration to read 2915, edit 2920, or clear 2925 the application. Additionally, a user may select a server 2935 from server window 2930. A user may also enter a web services path into text box 2940. Once information is entered, a user may add to grid 2970, delete from grid 2975, save all configurations 2980, and delete all configurations 2985. By selecting add to grid button 2875, a user may cause web services information to be displayed on grid 2950. Additionally, a user may select web service path(s) 2945 and 2990 listed on grid 2950 and click save all configuration button 2980 in order to cause the named web service(s) to be associated with the named application(s) and server(s). Accordingly, the named web service(s) will become available on the diagnostic utility screen 200 depicted in FIG. 2. The information entered in FIG. 29 may be stored in .txt file(s), which may be stored on server(s). A user may direct any number of .txt file(s) to be stored on any number of server(s).

Embodiments may be implemented using hardware, firmware, software, or any combination thereof. Standard computer hardware and/or software programming techniques may be used. Any of the functionality described herein may be performed by computer hardware or software. Such computer hardware or software may convey the results of such calculations to a user by way of a user readable display, or may convey the results to further hardware or software for further processing. Any software described herein may be implemented on a computer readable media, such as, by way of non limiting example, computer magnetic or optical discs and magnetic tape.

In the proceeding specification, various preferred embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

We claim:

1. A system comprising:
a server communicatively coupled to a network, wherein the server is configured to execute at least one application, the application configured to:
provide a remote device having access to the server with information in a format allowing the remote device to consolidate the information with information from a plurality of servers, wherein the consolidated information comprises server processor usage, server memory usage, server processes, and installed server applications associated with the plurality of servers, where the consolidated information allows a user of the remote device to monitor and diagnose a cause of a partial outage among one or more of the servers in the plurality of servers;

provide the remote device access to the server over the network to remotely modify features of the server by modifying a configuration file associated with the system, the configuration file stored on the server, wherein the features comprise: server processes and server services; and electronic storage storing the configuration file.

2. The system of claim 1, wherein the application comprises software embodied on a non-transitory computer readable medium.

3. The system of claim 1, comprising a computer processor configured to install the at least one application on the system.

4. The system of claim 1, wherein the information further comprises an item selected from the group consisting of: server available random access memory, server available persistent storage, .NET assembly information, keep alive information, terminal session information, machine configuration information, database information, SQL job information, services information, event logs, scheduled tasks, server configuration files, web configuration files, terminal services information, and scheduled task information.

5. A method comprising:

receiving, at a receiving server of a plurality of servers and over a computer network, consolidated information regarding each of the plurality of servers, wherein the consolidated information is provided by software and comprises: server processor usage, server memory usage, server processes, and installed server applications associated with the plurality of servers;

remotely modifying features of at least one of the plurality of servers different from the receiving server, wherein the remotely modifying is performed through the receiving server, wherein the features comprise: server processes and server services, wherein the modifying comprises modifying at least one of a plurality of configuration files associated with the plurality of servers, and wherein the plurality of configuration files are stored on each of the plurality of servers;

whereby the receiving allows a user to monitor and diagnose a cause of an outage involving the at least one of the plurality of servers different from the receiving server, and whereby the remotely modifying allows the user to correct the cause of the partial outage.

6. The method of claim 5, further comprising:

installing the software on each of the plurality of servers.

7. The method of claim 5, wherein the information further comprises an item selected from the group consisting of: server available random access memory, server available persistent storage, keep alive information, terminal session information, machine configuration information, database information, SQL job information, services information, event logs, scheduled tasks, server configuration files, web configuration files, terminal services information, and scheduled task information.

8. A method comprising:

receiving, using a computer processor, information about each of a plurality of servers, the information for each server comprising a server identification, an identification of at least one application configured to execute on the server, and an identification of a configuration path of the server;

locally storing the information for each server, whereby the information for each server is accessible on the network;

monitoring each of the plurality of servers in real time via a graphical user interface, wherein the monitoring is based on the information for each server; and remotely modifying features of at least one of the plurality of servers, wherein the features comprise: server processes and server services, wherein the modifying comprises modifying at least one of a plurality of configuration files associated with the plurality of servers, and wherein the plurality of configuration files are stored on each of the plurality of servers.

9. The method of claim 8, further comprising:

installing software on each of the plurality of servers.

10. The method of claim 8, wherein the graphical user interface presents information about each of the plurality of servers regarding at least one of: server available random access memory, server available persistent storage, keep alive information, terminal session information, machine configuration information, database information, SQL job information, services information, event logs, scheduled tasks, server configuration files, web configuration files, terminal services information, and scheduled task information.

11. The method of claim 8, further comprising detecting a cause of an outage based on the monitoring each of the plurality of servers in real time via a graphical user interface.

12. A computer program product comprising a non-transitory computer-readable storage medium having computer-readable instructions stored therein, wherein the computer-readable instructions are configured to be readable from the at least one medium by at least one computer processor and thereby cause the at least one computer processor to operate so as to:

receive consolidated information regarding each of the plurality of servers, wherein the consolidated information is provided by software and comprises: server processor usage, server memory usage, server processes, and installed server applications associated with the plurality of servers;

remotely modify features of at least one of the plurality of servers different from the receiving server, wherein the remotely modifying is performed through the receiving server, wherein the features comprise: server processes and server services, wherein the modifying comprises modifying at least one of a plurality of configuration files associated with the plurality of servers, and wherein the plurality of configuration files are stored on each of the plurality of servers;

whereby the receiving allows a user to monitor and diagnose a cause of an outage as involving the at least one of the plurality of servers different from the receiving server, and whereby the remotely modifying allows the user to correct the cause of the partial outage.

13. The computer program product of claim 12, wherein the at least one computer processor is further configured to:

install the software on each of a plurality of servers.

14. The computer program product of claim 12, wherein the at least one computer processor is further configured to provide a graphical user interface.

15. The computer program product of claim 14, wherein the graphical user interface presents information about each of the plurality of servers regarding at least one of:

server available random access memory, server available persistent storage, keep alive information, terminal session information, machine configuration information, database information, SQL job information, services information, event logs, scheduled tasks, server configuration files, web configuration files, terminal services information, and scheduled task information.

16. The computer program product of claim 12, further comprising detecting a cause of an outage based on the monitoring each of the plurality of servers in real time via a graphical user interface.

* * * * *